United States Patent
Ikeda et al.

(10) Patent No.: US 6,342,924 B1
(45) Date of Patent: Jan. 29, 2002

(54) ADDITIONAL INFORMATION SUPERPOSITION METHOD AND VIDEO SIGNAL OUTPUTTING APPARATUS

(75) Inventors: Nozomu Ikeda; Akira Ogino; Takashi Kohashi, all of Tokyo; Yuji Kimura, Kanagawa; Hisayoshi Moriwaki, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/392,050

(22) Filed: Sep. 8, 1999

(30) Foreign Application Priority Data

Sep. 10, 1998 (JP) .......................................... 10-256918

(51) Int. Cl.$^7$ ................................................. H04N 7/08
(52) U.S. Cl. .......................... 348/473; 386/94; 380/203
(58) Field of Search ................................. 348/478, 556, 348/445, 558, 473, 476; 380/201, 200, 203; 386/94; 382/100, 232

(56) References Cited

U.S. PATENT DOCUMENTS

| 3,984,624 A | * | 10/1976 | Waggener | 348/473 |
| 4,890,283 A | * | 12/1989 | Tsinberg et al. | 370/84 |
| 5,812,300 A | * | 1/1999 | Yagasaki et al. | 386/94 |
| 5,859,950 A | * | 1/1999 | Fwamoto | 386/94 |
| 5,907,656 A | * | 5/1999 | Oguro | 386/94 |
| 5,991,500 A | * | 11/1999 | Kamoto et al. | 386/94 |
| 6,115,534 A | * | 9/2000 | Cookson et al. | 386/94 |
| 6,154,571 A | * | 11/2000 | Lox et al. | 382/250 |
| 6,229,572 B1 | * | 5/2001 | Ciardullo et al. | 348/473 |
| 6,271,887 B1 | * | 8/2001 | Ogino et al. | 348/478 |

* cited by examiner

Primary Examiner—Victor R. Kostak
(74) Attorney, Agent, or Firm—Frommer Lawrence & Haug LLP; William S. Frommer

(57) ABSTRACT

Disclosed herein are an additional information superposition method and a video signal outputting apparatus, wherein the additional information superposition method for superposing additional information spectrum spread with spread codes synchronized with a vertical synchronizing signal on a second video signal for forming an image of an aspect ratio of N:n which is to be converted into and outputted as a first video signal for forming an image of another aspect ratio of M:m, comprising the steps of setting a size of a unit block before conversion in the second video signal based on a size of a unit block after conversion to which one chip of spread codes for despreading determined in advance is allocated and contents of a conversion process into the first video signal, and superposing the additional information spectrum spread with the spread codes of one chip allocated for each unit block before conversion having the set size in such a manner as to allow the additional information to be extracted from the first video signal.

26 Claims, 20 Drawing Sheets

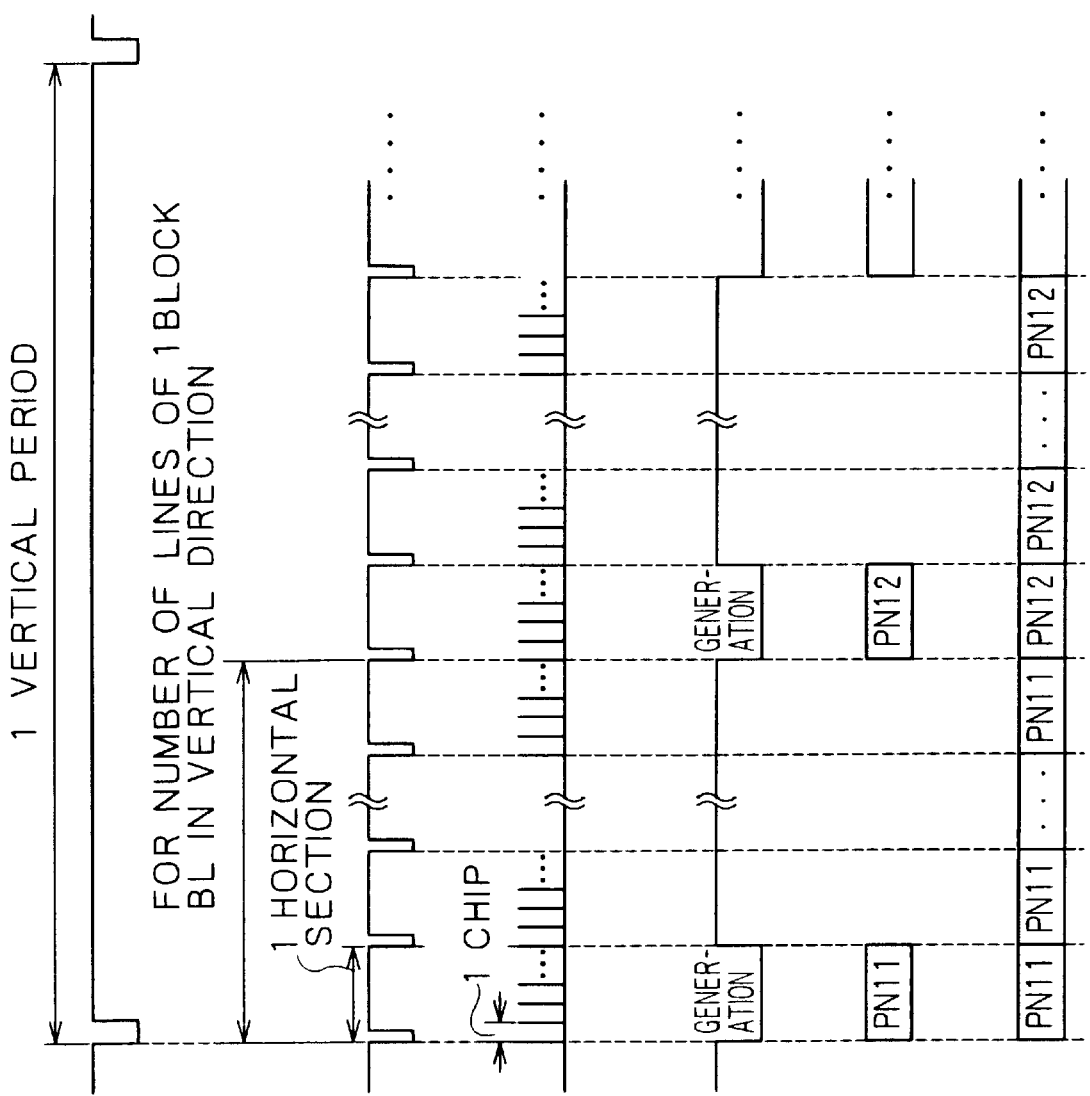

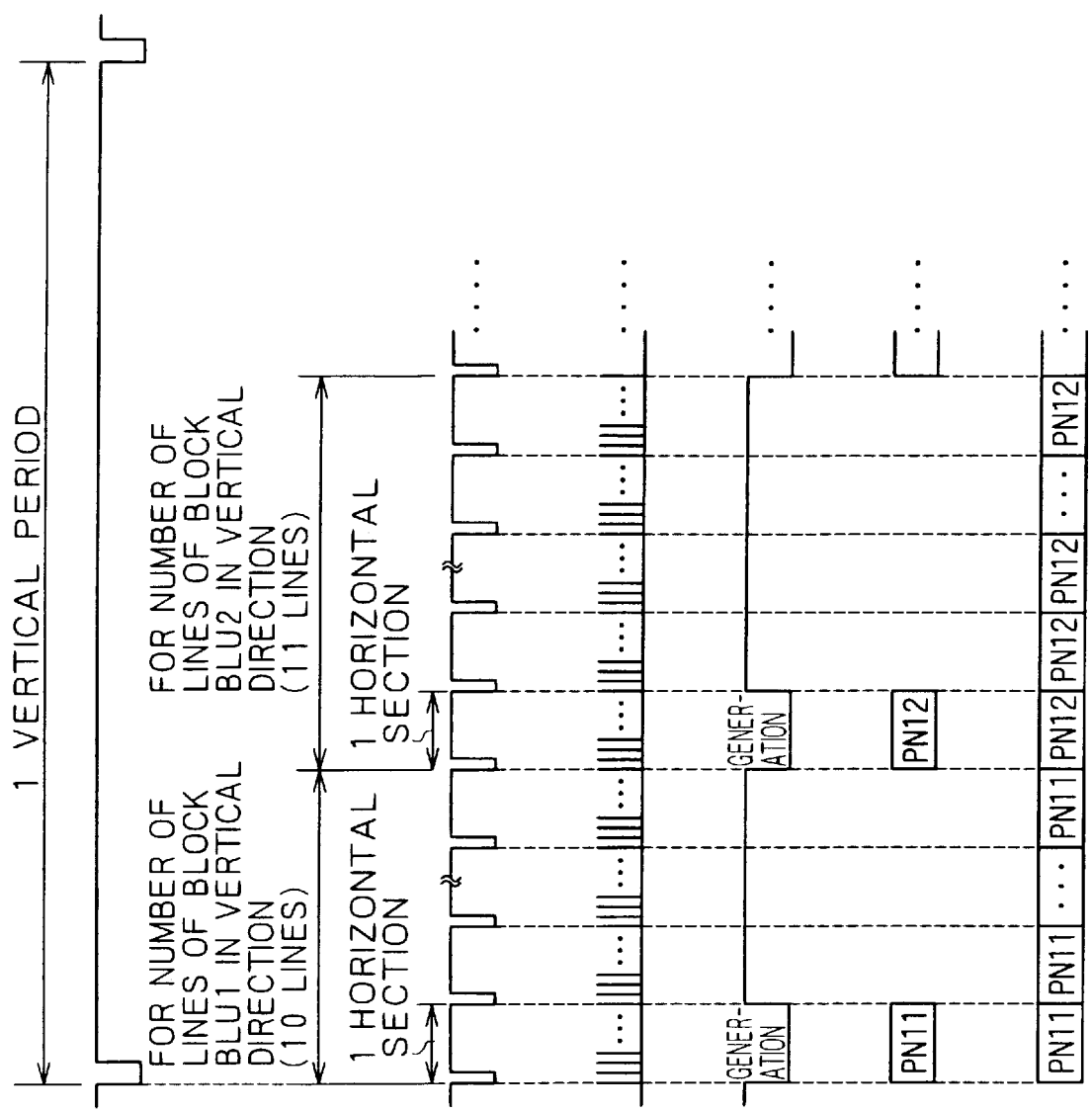

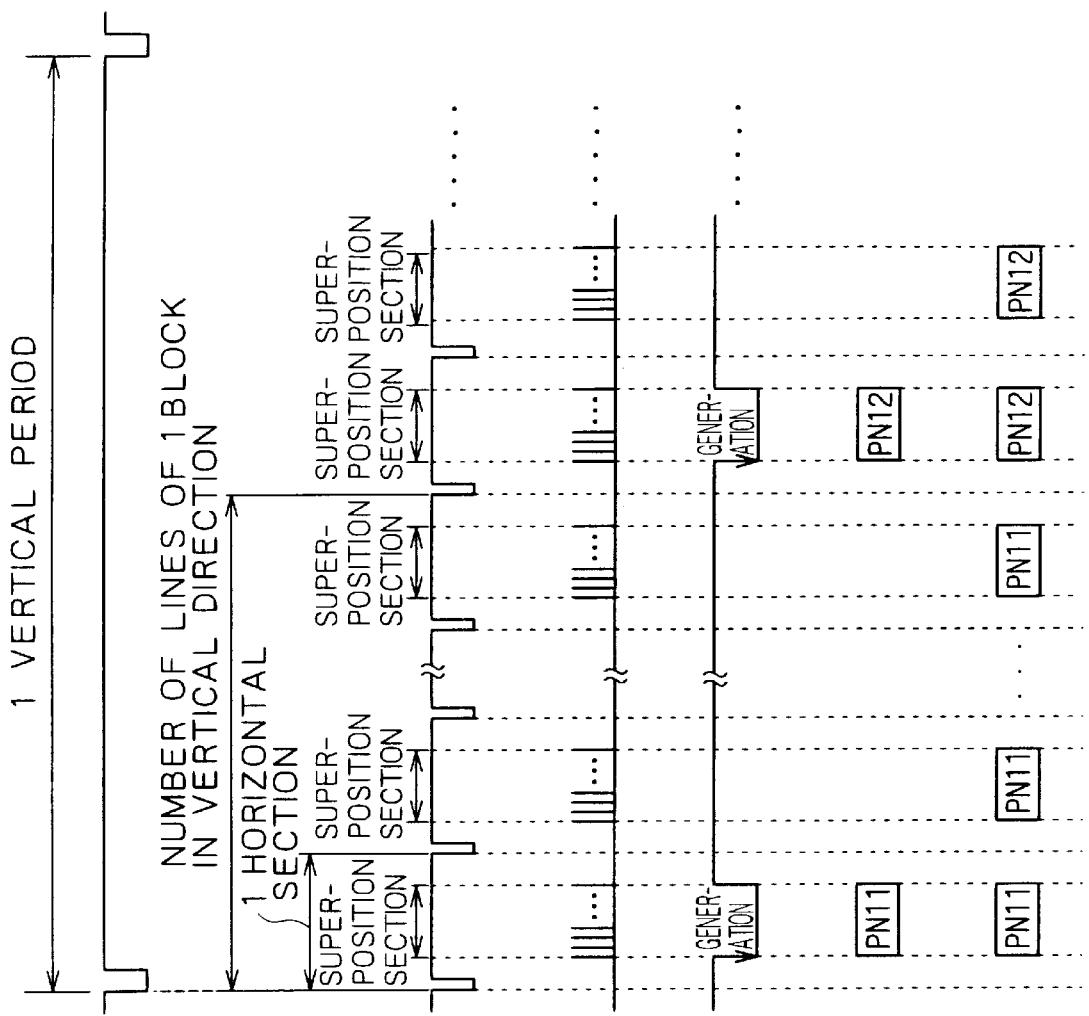

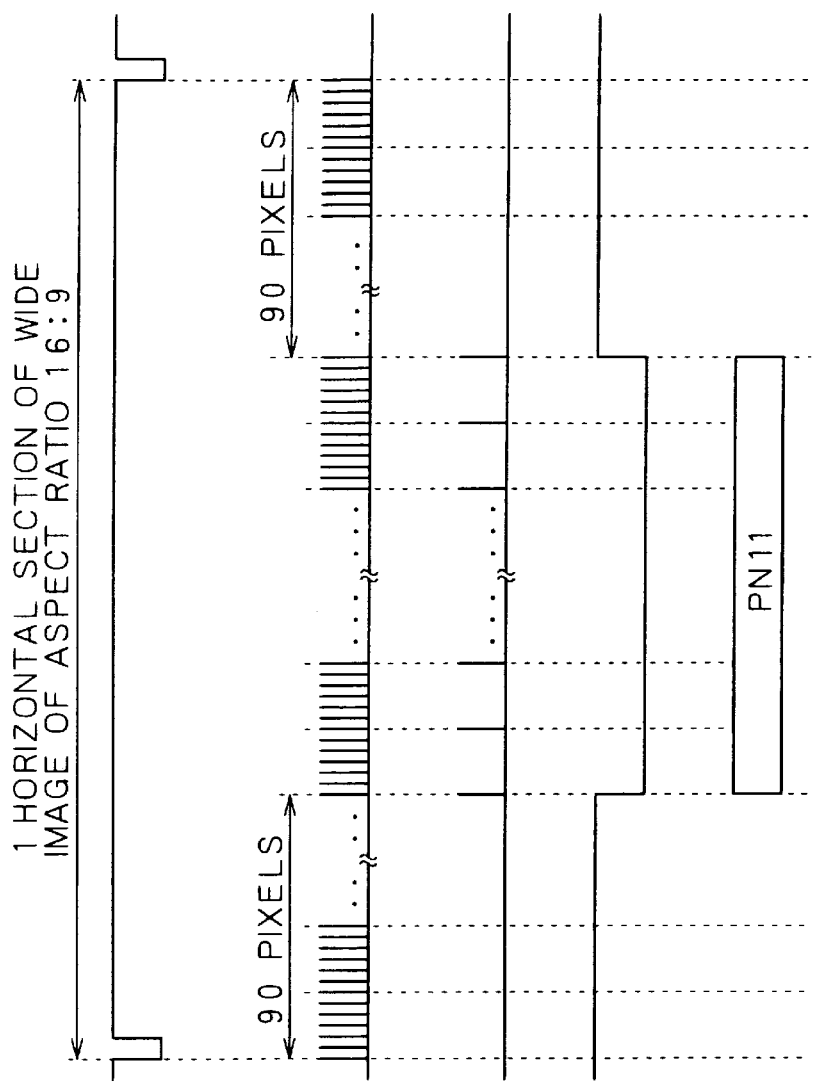

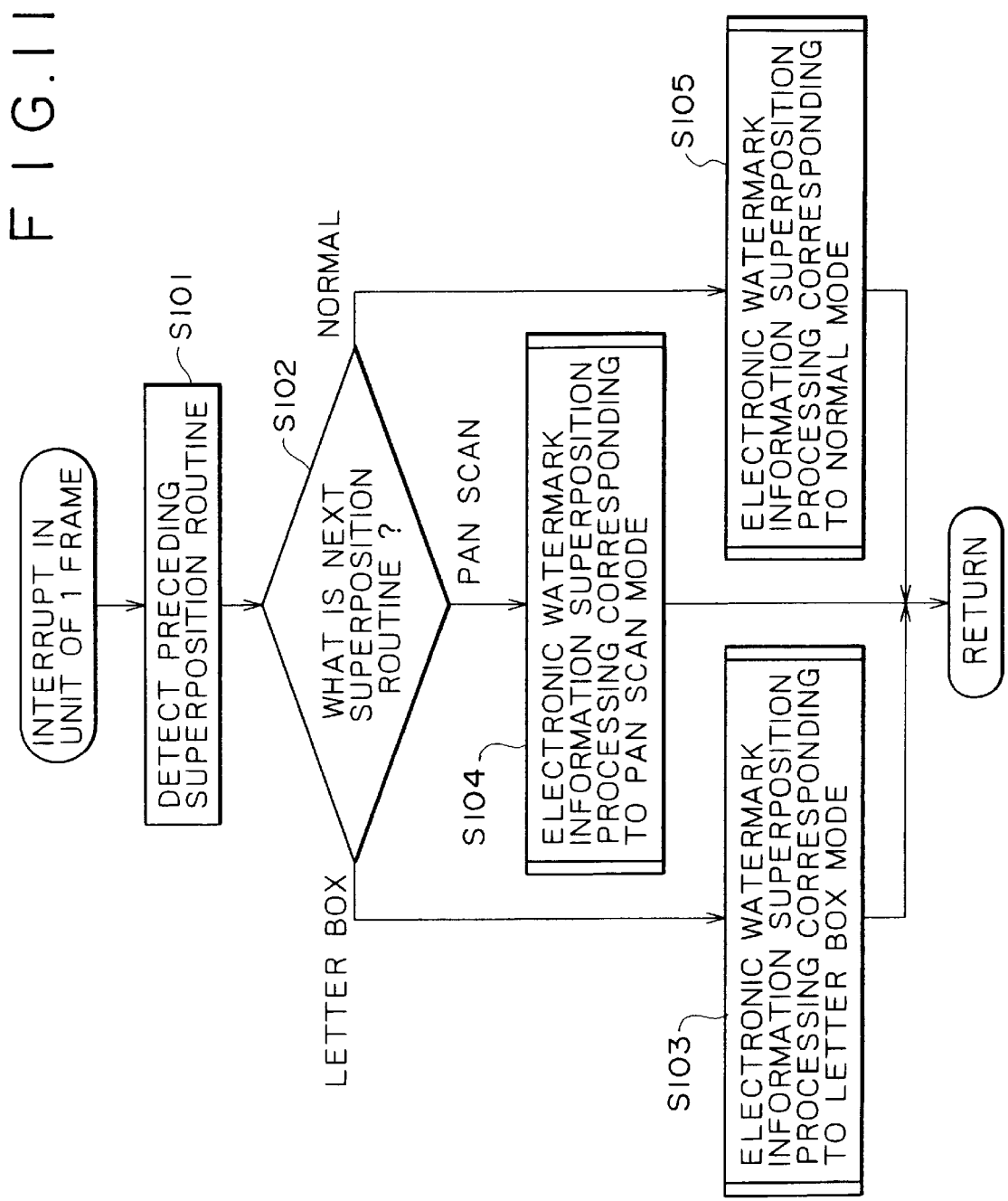

DUPLICATION CONTROL
INFORMATION SPECTRUM
BEFORE SPECTRUM
SPREADING

DUPLICATION CONTROL
INFORMATION SPECTRUM
AFTER SPECTRUM
SPREADING

SPECTRUM OF INFORMATION SIGNAL
ON WHICH SS DUPLICATION CONTROL
INFORMATION IS SUPERPOSED

SIGNAL SPECTRUM AFTER
SPECTRUM DESPREADING

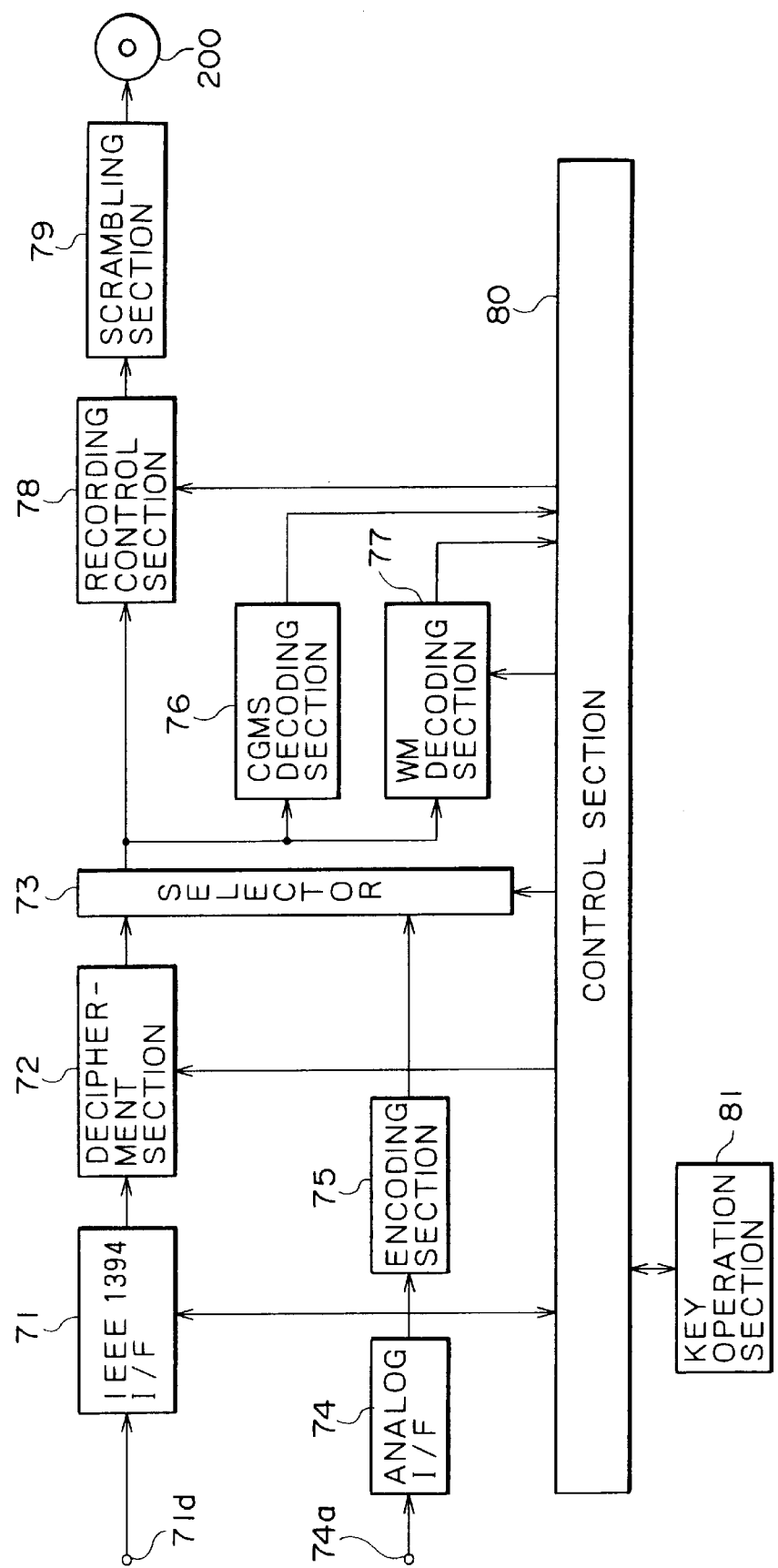

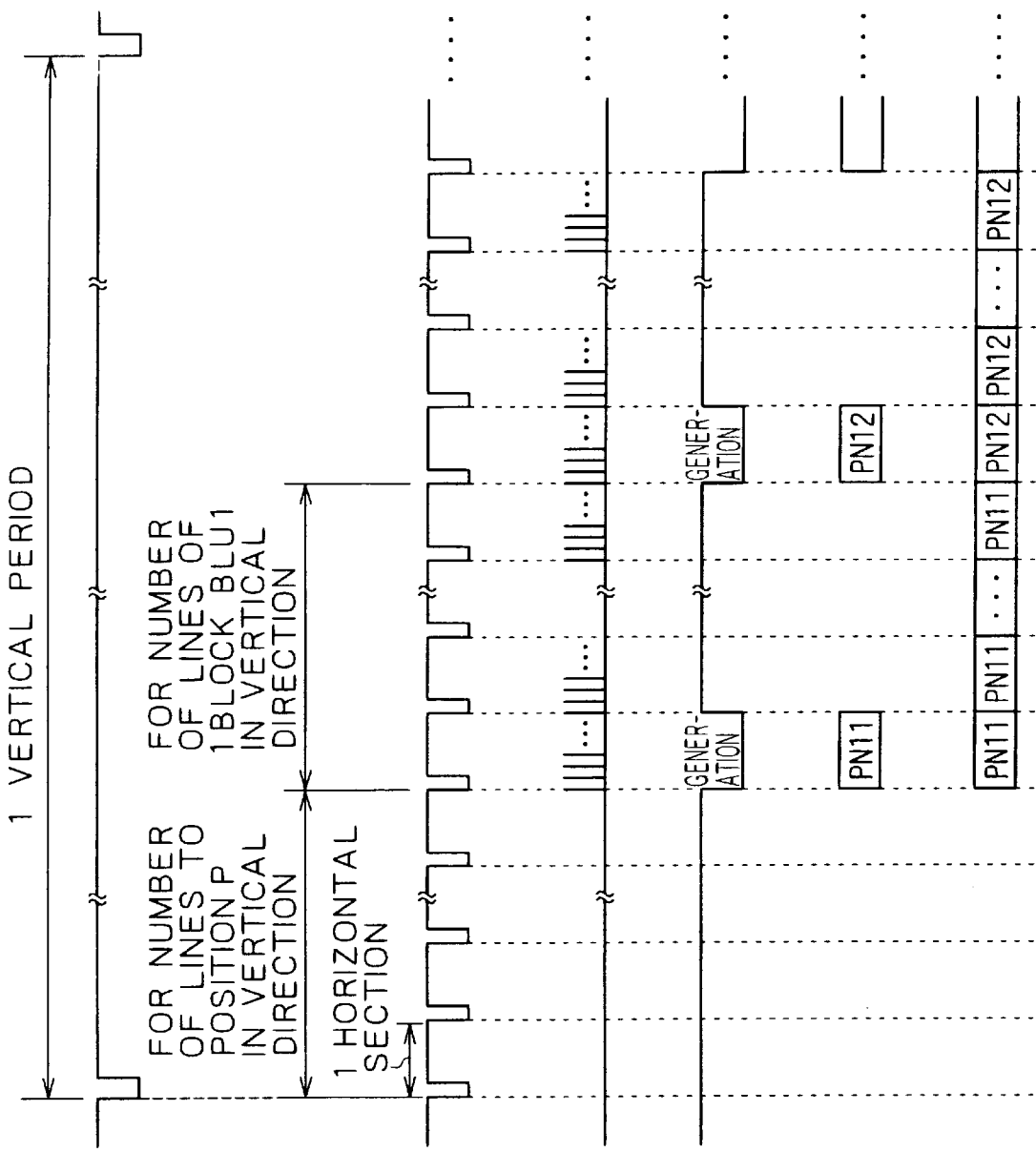

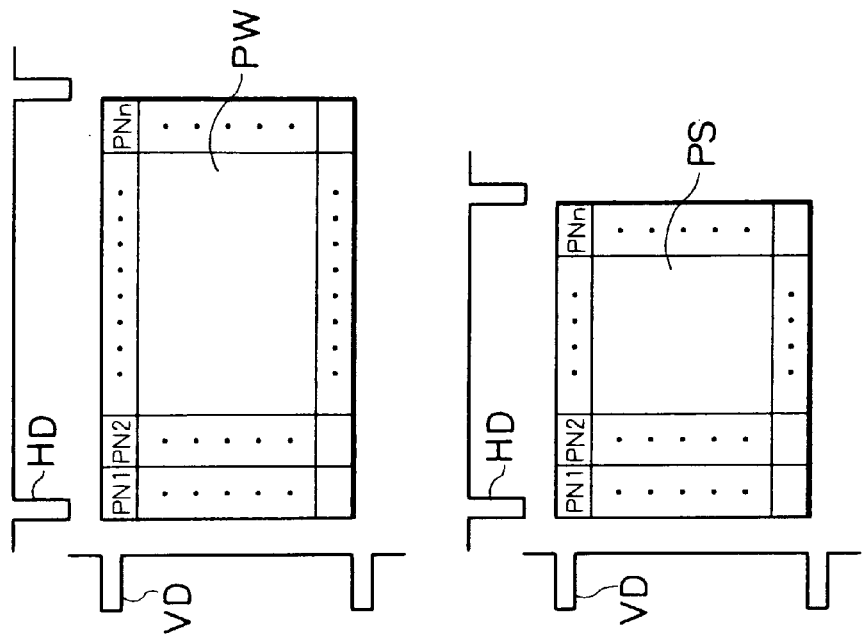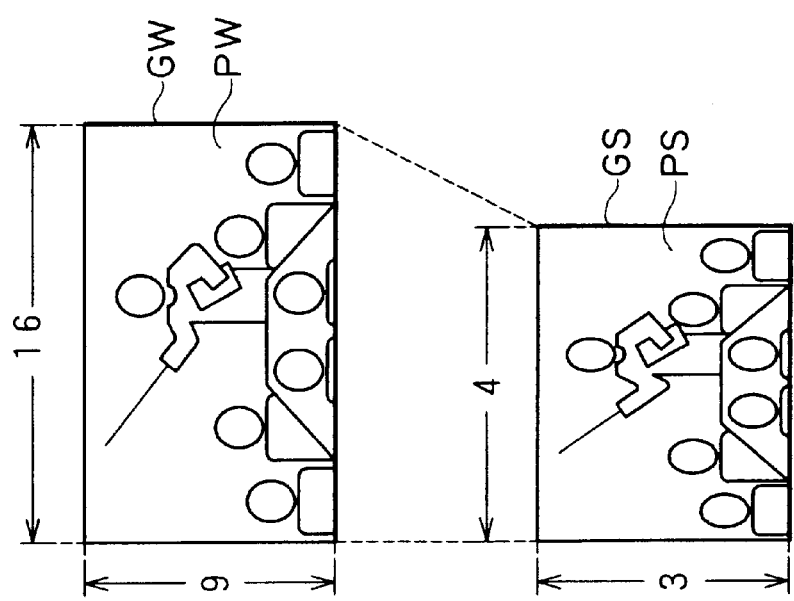

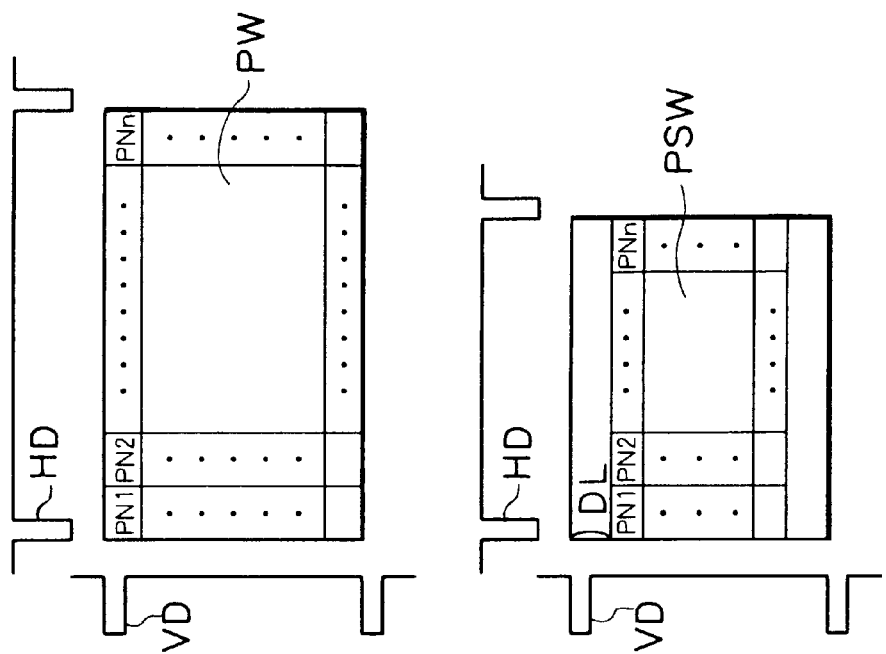
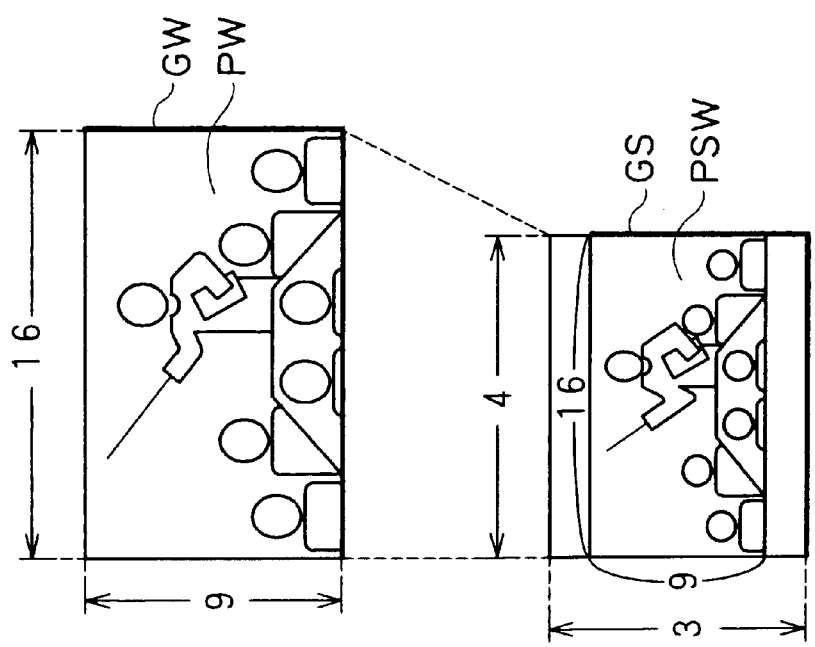

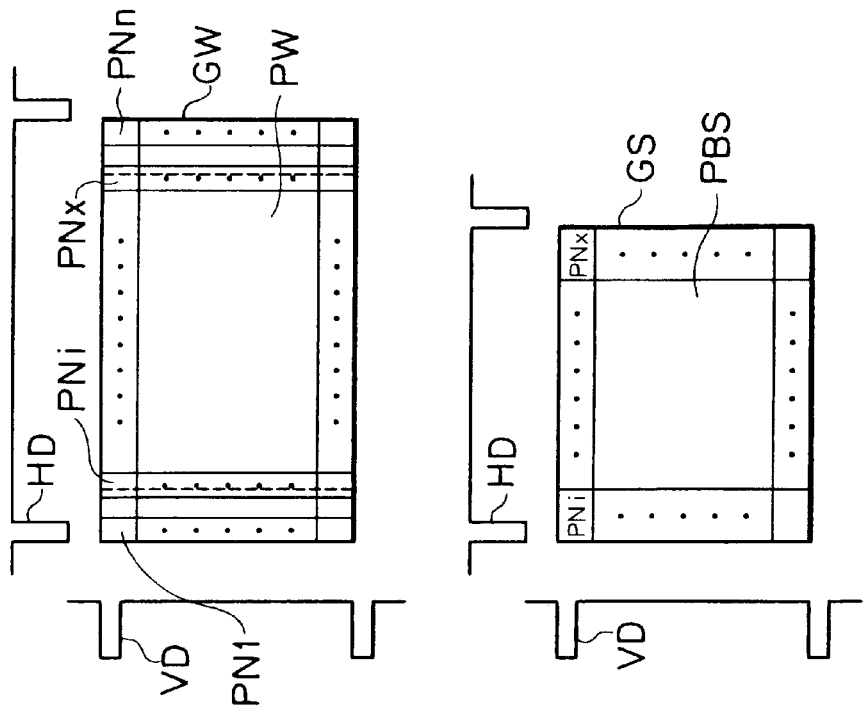
FIG. 19C
FIG. 19D
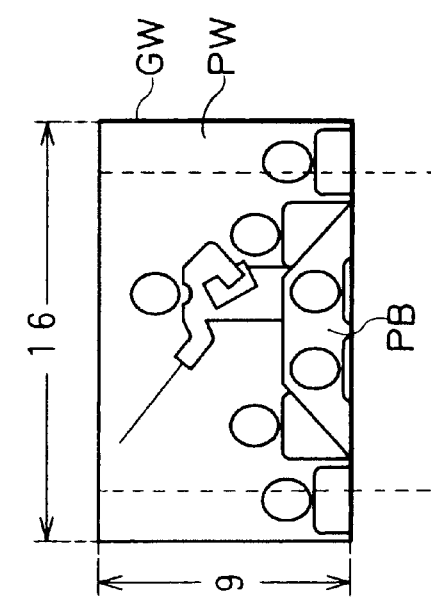
FIG. 19A
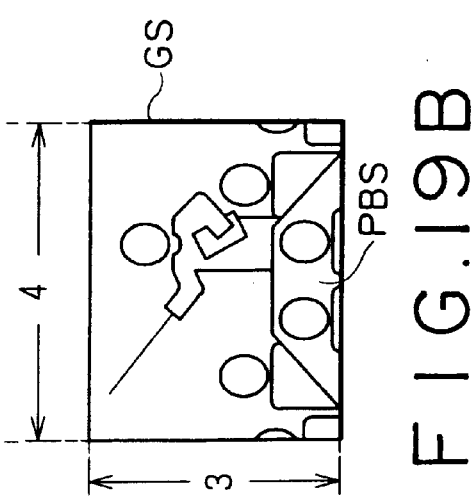
FIG. 19B

INTERPOLATE PIXELS IN HORIZONTAL DIRECTION

ADDITIONAL INFORMATION SUPERPOSITION METHOD AND VIDEO SIGNAL OUTPUTTING APPARATUS

BACKGROUND OF THE INVENTION

This invention relates to an additional information superposition method for superposing spectrum spread additional information on a video signal such that, for example, when the video signal is converted into another video signal of a different aspect ratio, the superposed additional information can be extracted from the video signal after the conversion, and a video signal outputting apparatus which employs the additional information superposition method.

Various contents information such as image information and sound information can be provided abundantly through various media such as a video tape, a digital video disk (DVD), the Internet and broadcasting media. Meanwhile, infringement on copyright by illegal duplication (copy) of various contents information provided through various media has come into question.

In order to cope with this problem, various countermeasures have been proposed. For example, information for duplication control or copyright information is added to contents information such as image information, and the additional information is used to prevent illegal duplication of the contents information or to pursue an illegal duplicator of the contents information.

Further, a method has been proposed to superpose additional information to be added to contents information making use of an electronic watermark process. The electronic watermark process is a process of to embedding information as noise in a portion of image data or music data which is not significant on the perception of human beings, that is, a portion which is not redundant to music or an image.

Additional information embedded in image data or music data using such an electronic watermark process as described above is difficult to be removed from the image data or music data. On the other hand, even after a filtering process or a data compression process is performed for the image data or music data, the additional information of the electronic watermark (electronic watermark information) embedded in the image data or music data can be extracted from the image data or music data.

In this manner, by making use of an electronic watermark process, electronic watermark information can be superposed on contents information such that it cannot be removed or modified readily. Further, since the electronic watermark information superposed on the contents information can be extracted with certainty, for example, by a recording apparatus, illegal duplication of the contents information can be prevented using the electronic watermark information superposed on the contents information.

An electronic watermark process which makes use of a spectrum spreading technique is known as one of such electronic watermark processes as described above. The electronic watermark process spectrum spreads additional information to convert it into a broad-band signal of a low level which can be regarded as noise with respect to an information signal such as image data and superposes the signal on the information signal such as image data.

Spectrum spreading of additional information is performed by multiplying the additional information by spread codes generated in a sufficiently short period. The additional information in the form of a broad-band signal of a low level obtained by spectrum spreading can be extracted as an original narrow-band signal of a high level by performing despreading of multiplying the additional information by the spread codes same as those used upon spectrum spreading at same timings.

Thus, it has been proposed to generate, when it is tried to superpose spectrum spread additional information (electronic watermark information) on a video signal, spread codes in synchronism with a vertical synchronizing signal such as, for example, in a one-frame period or a two-frame period and superpose additional information spectrum spread with the spread codes on the video signal.

Therefore, in order to extract the electronic watermark information superposed on the video signal, spread codes same as those used upon spectrum spreading can be generated at same timings to despread the additional information spectrum spread and superposed on the video signal by using a video synchronizing signal as a reference signal. Consequently, the additional information spectrum spread and superposed on the video signal can be extracted rapidly with certainty.

However, some of video signals provided through DVDs or broadcasting media are for forming an image having an aspect ratio of 16:9. In order to display an image of the aspect ratio of 16:9 on a monitor receiver or a like having a frame of another aspect ratio of 4:3 which is spread widely, the video signal must be converted into another video signal for forming an image of the aspect ratio of 4:3.

In this instance, if the video signal for forming an image of the aspect ratio of 16:9 has additional information added thereto which is spectrum spread with spread codes generated, for example, in synchronism with a video signal synchronizing signal, then when the video signal is converted into another video signal for forming an image of the aspect ratio of 4:3, the additional information superposed on the video signal before such conversion cannot sometimes be detected from within the video signal after the conversion.

Several methods are available to convert a video signal for forming an image of the aspect ratio of 16:9 to another video signal for forming an image of the aspect ratio of 4:3 including, for example, a normal process, a letter box process and a pan scan process.

The normal process forms, from a video signal for forming an image of the aspect ratio of 16:9, another video signal for forming an entire image PW to be displayed on a screen GW of the aspect ratio of 16:9 as seen in FIG. 17A as another image PS on another screen GS of the aspect ratio of 4:3 as seen in FIG. 17B.

The video signal formed by the normal process allows an entire image PW of the aspect ratio of 16:9 to be displayed as another image PS of the aspect ratio of 4:3 without any miss as seen from FIGS. 17A and 17B.

In this case, even if additional information spectrum spread with spread codes PN1, PN2, . . . generated, for example, in a one frame period is superposed in synchronism with a vertical synchronizing signal VD on the video signal for forming an image PW of the aspect ratio of 16:9 as seen in FIG. 17C, when the video signal is converted into another video signal for forming another image PS of the aspect ratio of 4:3, the additional information spectrum spread with the spread codes PN1, PN2, . . . is not lost as seen in FIG. 17D.

Accordingly, from a video signal formed by the normal process for forming an image PS of the aspect ratio of 4:3, additional information spectrum spread and superposed on the video signal can be extracted by generating spread codes PN1, PN2, . . . in a one frame period in synchronism with a vertical synchronizing signal VD of the video signal and despreading the video signal with the spread codes.

Meanwhile, the letter box process forms, from a video signal for forming an image PW to be displayed on a screen GW of the aspect ratio of 16:9, another video signal for displaying the entire image PW as seen in FIG. 18A as another image PSW on another screen GS of the aspect ratio of 4:3 as seen in FIG. 18B.

In this instance, an image PSW of the aspect ratio of 16:9 is displayed in a predetermined area including a predetermined plurality of horizontal lines in a vertical direction in the screen GS of the aspect ratio of 4:3 as seen in FIG. 18B, and a pair of image non-displaying areas in which no image is displayed are provided at upper and lower portions of the screen GS.

Accordingly, where additional information spectrum spread with spread codes PN1, PN2, . . . generated, for example, in a one frame period is superposed on a video signal for forming an image PW of the aspect ratio of 16:9 as seen in FIG. 18C, if the video signal is converted into another video signal for forming another image PS of the aspect ratio of 4:3 by the letter box process, then the display position of an image PSW on which the spectrum spread additional information is superposed is delayed with respect to the vertical synchronizing signal VD as seen in FIG. 18D.

On the other hand, in order to allow the image PW of the aspect ratio of 16:9 to be displayed in the screen GS of the aspect ratio of 4:3, horizontal lines are thinned out in a vertical direction from the image PW of the aspect ratio of 16:9 to form the image PSW of the aspect ratio of 16:9 to be displayed in the screen GS of the aspect ratio of 4:3. Consequently, the number of horizontal lines in a vertical direction is different between the image PW of the aspect ratio of 16:9 and the image PSW of the aspect ratio of 16:9.

Therefore, even if spread codes PN1, PN2, . . . are generated in a one frame period in synchronism with a vertical synchronizing signal VD of a video signal for forming an image PS of the aspect ratio of 4:3, the spread codes cannot be generated at same timings as those when the additional information was spectrum spread, and the additional information spectrum despread and superposed on the video signal cannot be extracted.

The pan scan process cuts out, from an image PW to be displayed on a screen GW of the aspect ratio of 16:9 from a video signal for forming an image of the aspect ratio of 16:9, an image PB of a predetermined area which can be displayed without any distortion on another screen of the aspect ratio of 4:3 as seen in FIG. 19A. Then, a video signal for forming the thus cut out image PB as an image PBS on a screen GS of the aspect ratio of 4:3 as seen in FIG. 19B is formed from the video signal for forming the image PW of the aspect ratio of 16:9.

In this instance, the image PB (FIG. 20B) cut out from the image PW of the aspect ratio of 16:9 (FIG. 20A) and including M pixels in each horizontal line is formed from portions cut out from horizontal sections of the video signal for forming the image PW as can be apparently seen with reference to a horizontal synchronizing signal HD. Accordingly, the horizontal sections of the video signal which form the cut out image PB are shorter in time.

Therefore, interpolation of pixels is performed for the horizontal sections of the cut out image PB to form a video signal for displaying an image PBS, which includes m pixels in each horizontal line, corresponding to the cut out image PB fully on a screen GS of the aspect ratio of 4:3 as seen in FIG. 20C.

Accordingly, in the pan scan process, where additional information spectrum spread with spread codes PN1, PN2, . . . generated, for example, in a one frame period in synchronism with a vertical synchronizing signal VD is superposed on a video signal for forming an image PW of the aspect ratio of 16:9 as seen in FIG. 19C, when the video signal is converted into another video signal for forming another image PBS of the aspect ratio of. 4:3, the spread codes with which the additional information superposed on the video signal is spectrum spread are generated but in a displaced phase with respect to the vertical synchronizing signal VD as seen in FIG. 19D.

In short, the video signal for forming the image PBS of the aspect ratio of 4:3 has the additional information superposed thereon which is superposed on the video signal at a portion which forms the cut out image PB as seen in FIG. 19D. Since the additional information is spectrum spread with spread codes PNi to PNx, the generation phase of the spread codes with which the additional information is spectrum spread is displaced from the vertical synchronizing signal VD.

Further, the video signal for forming the image PBS is interpolated with pixels in the individual horizontal sections as described above with reference to FIGS. 20A to 20C. Therefore, not only the spread codes are generated in a displaced phase, but also the generation period of the spread codes per one chip is displaced.

Therefore, even if despreading is performed using spread codes PN1, PN2, . . . PNn generated in a one frame period in a similar manner as in a case wherein spectrum spread additional information is superposed on a video signal for forming an image PW of the aspect ratio of 16:9, the additional information spectrum spread and superposed on the vide signal for forming the image PBS cannot be detected.

Then, of images formed by the normal process, letter box process and pan scan process, the image displayed based on the video signal formed by the normal process is distorted in a vertical direction of the screen. Therefore, it is considered that the letter box process or the pan scan process which allows an image to be displayed without any distortion is in most cases used to convert a video signal for forming an image of the aspect ratio of 16:9 into another video signal for forming another image of the aspect ratio of 4:3.

The normal process, letter box process or pan scan process described above is normally performed on the transmission side. In particular, where a vide signal for forming an image of the aspect ratio of 16:9 is provided through a DVD, conversion processing to another video signal for forming another image of the aspect ratio of 4:3 is performed by a reproduction apparatus for a DVD.

Consequently, if a recording apparatus for receiving a video signal from the reproduction apparatus for a DVD receives a video signal formed by the letter box process or the pan scan process, then it cannot generate spread codes same as those used upon spectrum spreading at same timings from additional information spectrum spread and superposed on the received video signal. Thus, the recording apparatus cannot perform despreading appropriately to extract electronic watermark information superposed on the received video signal.

In this instance, even if electronic watermark information which signifies inhibition of duplication is superposed on the original video signal, since the electronic watermark information cannot be extracted, duplication (recording) of the video signal onto a in recording medium is permitted, and this gives rise to a problem that prevention of illegal duplication cannot be achieved.

SUMMARY OF THE INVENTION

It is an object of the present invention to provide an additional information superposition method by which additional information can be spectrum spread and superposed on a video signal such that, even if the video signal is converted into a second video signal for forming an image having a different aspect ratio, the additional information spectrum spread and superposed on the original video signal can be extracted from the second video signal and a video signal outputting apparatus which employs the additional information superposition method.

In order to attain the object described above, according to an aspect of the present invention, there is provided an additional information superposition method for superposing additional information spectrum spread with spread codes synchronized with a vertical synchronizing signal on a second video signal for forming an image of an aspect ratio of N:n which is to be converted into and outputted as a first video signal for forming an image of another aspect ratio of M:m, comprising the steps of setting a size of a unit block before conversion in the second video signal based on a size of a unit block after conversion to which one chip of spread codes for despreading determined in advance is allocated and contents of a conversion process into the first video signal, and superposing the additional information spectrum spread with the spread codes with the spread codes of one chip allocated for each unit block before conversion having the set size in such a manner as to allow the additional information to be extracted from the first video signal.

In the additional information superposition method, when, from the first video signal formed by conversion of the second video signal, the additional information spectrum spread and superposed on the first video signal is extracted, the size of the unit block after conversion to which one chip of the spread codes for despreading is allocated is determined in advance.

The size of the unit block before conversion in the second video signal is set based on the size of the unit block after conversion and contents of a conversion process into the first video signal so that the size of the unit block after conversion may be a predetermined size. The additional information spectrum spread with the a spread codes with the spread codes of one chip allocated for each unit block before conversion having the set size if is superposed on the second video signal.

Consequently, even when the second video signal for forming an image of the aspect ratio of N:n is converted into the first video signal for forming an image of the aspect ratio of M:m, the additional information superposed on the first video signal can be extracted with certainty without changing the extraction method such as changing the size of the unit block after conversion to which one chip of spread codes for despreading determined in advance is allocated.

The additional information superposition method may be constructed such that the first video signal is formed from the second video signal for forming an image of the aspect ratio of N:n by thinning out or interpolating pixels of the image of the second video signal in a horizontal direction or a vertical direction, and the size of the unit block before conversion is set in response to the number of pixels to be thinned out from or interpolated to the unit block before conversion in the horizontal direction or the vertical direction. In the additional information superposition method, even when the first video signal for forming an image of the aspect ratio of M:m is formed from the second video signal for forming an image of the aspect ratio of N:n by thinning out or interpolating pixels of the image of the second video signal in a horizontal direction or a vertical direction, the additional information superposed on the first video signal can be extracted with certainty without changing the extraction method.

The additional information superposition method may be constructed further such that the first video signal is for displaying the entire image of the aspect ratio of N:n to be formed with the second video signal without changing the aspect ratio in a predetermined region including a plurality of horizontal lines in a predetermined range of the screen of the aspect ratio of M:m in the vertical direction, and the size of the unit block before conversion is set in response to the number of horizontal lines to be thinned out in the vertical direction from the unit block before conversion. In the additional information superposition method, from the first video signal formed by a letter box process or a pan scan process, the additional information superposed on the first video signal can be extracted with certainty.

According to another aspect of the present invention, there is provided a video signal outputting apparatus for superposing additional information spectrum spread with spread codes synchronized with a vertical synchronizing signal on a second video signal for forming an image of an aspect ratio of N:n which is to be converted into and outputted as a first video signal for forming an image of another aspect ratio of M:m, comprising a synchronizing signal detection section for detecting a video synchronizing signal from the second video signal, a spread code generation control section for forming a generation timing signal synchronized with the video synchronizing signal from the synchronizing signal detection section for controlling a generation timing of the spread codes based on a size of a unit block before conversion in the second video signal which is set based on a size of a unit block after conversion to which one chip of spread codes for despreading determined in advance and contents of conversion processing into the first video signal in such a manner as to allow the additional information to be extracted from the first video signal, a spread code generation section for generating the spread codes in response to the generation timing signal from the spread code generation control section, a spreading section for receiving the additional information before spectrum spreading to be superposed on the second video signal and the spread codes from the spread code generation section and spectrum spreading the additional information with the spectrum codes, and an additional information superposition section for superposing the additional information spectrum spread by the spreading section on the second video signal.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 5A to 5F are waveform diagrams illustrating formation of electronic watermark information in accordance with the normal process;

FIGS. 7A to 7F are waveform diagrams illustrating formation of electronic watermark information in accordance with the letter box process;

FIGS. 9A to 9F are waveform diagrams illustrating formation of electronic watermark information in accordance with the pan scan process;

FIGS. 10A to 10E are waveform diagrams illustrating formation of electronic watermark information in accordance with the pan scan process;

FIG. 11 is a flow chart illustrating a flow of operations when superposition processing of electronic watermark information in accordance with the different processes is performed time-divisionally;

FIG. 15 is a block diagram showing a recording apparatus having a function of extracting electronic watermark information;

FIGS. 16A to 16F are waveform diagrams illustrating formation of a PN code train for despreading which is used to extract electronic watermark information from a video signal formed by the letter box process;

FIGS. 17A to 17D are diagrammatic views illustrating the normal process which is one of processes for converting a video signal for forming an image of the aspect ratio of 16:9 into another video signal of the aspect ratio of 4:3;

FIGS. 18A to 18D are diagrammatic views illustrating the letter box process which is another one of processes for converting a video signal for forming an image of the aspect ratio of 16:9 into another video signal of the aspect ratio of 4:3;

FIGS. 19A to 19D are diagrammatic views illustrating the pan scan process which is a further one of processes for converting a video signal for forming an image of the aspect ratio of 16:9 into another video signal of the aspect ratio of 4:3.

DESCRIPTION OF THE PREFERRED EMBODIMENT

Figure 1:
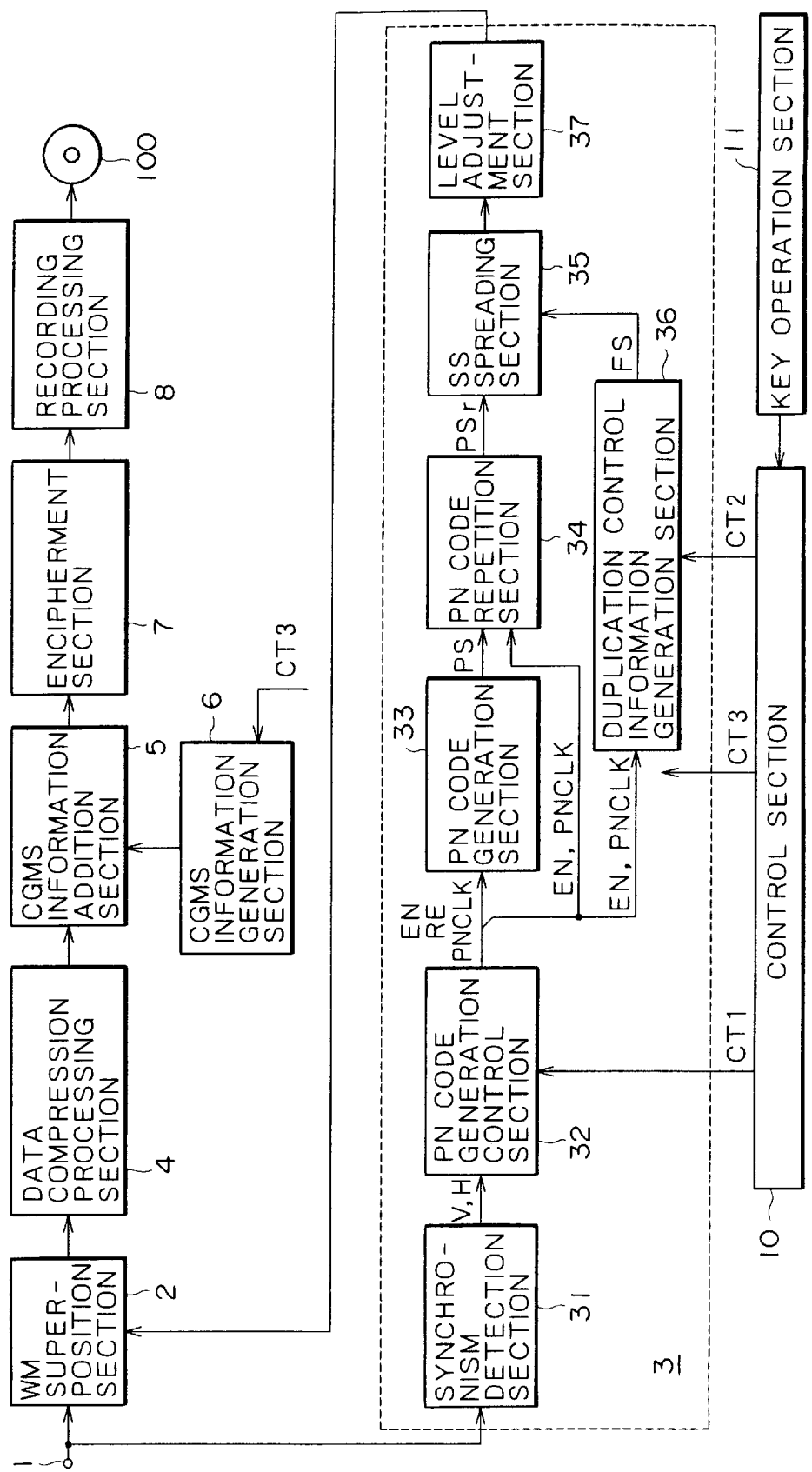
FIG. 1 is a block diagram of a video signal outputting apparatus to which an additional information superposition method according to the present invention is applied.

In the following, an embodiment of the present invention wherein it is applied to an additional information superposition method and a video signal outputting apparatus which employs the additional information superposition method is described.

In the embodiment described below, the video signal outputting apparatus is applied to a video signal recording apparatus which forms a video signal to be recorded onto a digital video disc (hereinafter referred to simply as DVD) and outputs the video signal to record it onto a DVD. The video signal recording apparatus is used by a contents information provider side which records and provides contents information of a video signal and so forth onto and as a DVD, and is called authoring apparatus.

In the embodiment described below, the authoring apparatus spectrum spreads and superposes, upon recording of a video signal onto a DVD, duplication control information as additional information to the video signal to be recorded in order to prevent the video signal from being duplicated illegally. In this instance, the additional information is spectrum spread with codes (hereinafter referred to as PN codes) of a PN (Pseudorandom Noise) sequence synchronized with a vertical synchronizing signal and allocated for each one frame such that one chip thereof is allocated to each unit block composed of a plurality of pixels in vertical and horizontal directions, and is superposed on a video signal.

Further, when a video signal (second video signal) recorded on the DVD for forming an image of the aspect ratio of 16:9 is reproduced by the authoring apparatus of the present embodiment described below, the normal process, letter box process or pan scan process may be used to convert the video signal into another video signal (first video signal) for forming another image of the aspect ratio of 4:3 to reproduce the video signal.

To this end, the authoring apparatus of the present embodiment described below superposes additional information such that, whichever one of the normal process, letter box process and pan scan process is used, the additional information can be extracted from the video signal for forming an image of the aspect ratio of 4:3 formed by the process.

More particularly, the authoring apparatus described below superposes, in order to make it possible to extract, from a video signal formed by the normal process, letter box process or pan scan process, additional information superposed on the video signal, the additional information on the video signal based on the video signal formed by the normal process, letter box process or pan scan process such that the additional information can be extracted without changing the extraction method every time in accordance with the egg applied process.

It is to be noted that, while the authoring apparatus can record not only a video signal but also an audio signal onto a DVD, for simplified description, description of the audio system is omitted in the following description.

[Authoring Apparatus]

FIG. 1 shows the authoring apparatus of the embodiment of the present invention. Referring to FIG. 1, the authoring apparatus of the present embodiment includes an input terminal 1 for a video signal, an electronic watermark information superposition section (hereinafter referred to as WM superposition section) 2, an electronic watermark information formation section (hereinafter referred to as WM formation section) 3, a data compression processing section 4, a CGMS information addition section 5 a CGMS information generation section 6, an encipherment section 7, a recording processing section 8, a control section 10, and a key operation section 11.

The control section 10 is a microcomputer including a CPU, a ROM, a RAM and other necessary components and controls several components of the authoring apparatus of the present embodiment. The key operation section 11 accepts an instruction input from an operator of the authoring apparatus. The control section 10 forms a control signal in response to the instruction from the operator inputted thereto through the key operation section 11 and supplies it to a necessary one of the components so that processing in accordance with the instruction of the operator may be performed.

The WM formation section 3 includes a synchronism detection section 31, a PN code generation control section 32, a PN code generation section 33, a PN code repetition section 34, an SS spreading section 35, a duplication control information generation section 36 and a level adjustment section 37.

When a control signal CT1 from the control section 10 indicates that a video signal inputted is for forming an image of the aspect ratio of 16:9 and electronic watermark information should be superposed on the video signal such that it can be extracted even when the video signal is converted into another video signal for forming another image of the aspect ratio of 4:3, the WM formation section 3 superposes electronic watermark information such that the electronic watermark information can be extracted from a video signal formed by any of the normal process, letter box process and pan scan process without changing the extraction method.

In other words, in the present embodiment, a video signal recording apparatus such as, for example, a recording apparatus for a DVD or a digital VTR (video tape recorder) is constructed such that it extracts electronic watermark information superposed on a received video signal presuming that the electronic watermark signal is spectrum spread with PN codes synchronized with a vertical synchronizing signal and allocated for each one frame such that one chip thereof is allocated to each unit block composed of 8×8 pixels in vertical and horizontal directions. In short, the size of a unit block to which one chip of PN codes for despreading is allocated is 8×8 pixels.

Therefore, the WM formation section 3 in the present embodiment superposes electronic watermark information such that it can extract, even if a video signal for forming an image of the aspect ratio of 16:9 is a video signal for forming another image of the aspect ratio of 4:3 formed using any of the normal process, letter box process and pan scan process, the electronic watermark information presuming that the electronic watermark information is spectrum spread with PN codes which are allocated for one frame such that one chip thereof is allocated to each unit block of 8×8 pixels as described above, and is superposed on the video signal.

In particular, the WM formation section 3 time-divisionally superposes electronic watermark information which can be extracted from a video signal outputted without any conversion for forming an image of the aspect ratio of 16:9 or a video signal formed by the normal process, electronic watermark signal which can be extracted from a video signal formed by the letter box process and electronic watermark information which can be extracted from a video signal formed by the pan scan process in different frames on a video signal to be recorded onto a DVD 100.

First, superposition of electronic watermark information which can be extracted from a video signal outputted without being converted for forming an image of the aspect ratio of 16:9 or a video signal formed by the normal process is described.

In the authoring apparatus shown in FIG. 1, a video signal to be recorded onto the DVD 100 for forming an image of the aspect ratio of 16:9 is supplied to the WM superposition section 2 and the synchronism detection section 31 of the WM formation section 3 through the input terminal 1. The synchronism detection section 31 extracts a vertical synchronizing timing signal V and a horizontal synchronizing timing signal H from the video signal inputted thereto and supplies its detection outputs to the PN code generation control section 32.

The PN code generation control section 32 uses the vertical synchronizing timing signal V and the horizontal synchronizing timing signal H as reference signals to generate a PN code reset timing signal RE (hereinafter referred to simply as reset signal RE) representative of a generation starting timing for PN codes, a PN generation enable signal EN representative of a section within which PN codes are to be generated, and a PN clock signal (clock signal) PNCLK.

Figure 2:
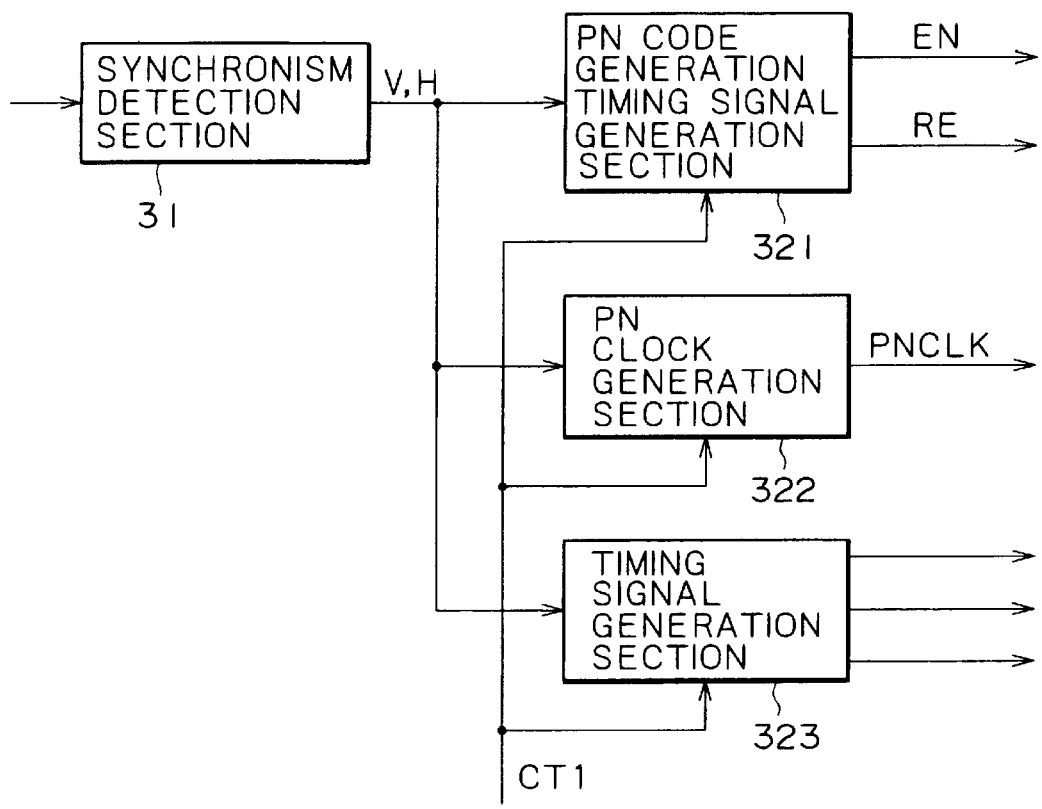
FIG. 2 is a block diagram showing a PN code generation control section shown in FIG. 1.

FIG. 2 shows an example of a detailed construction of the PN code generation control section 32 described above. Referring to FIG. 2, the PN code generation control section 32 includes a PN code generation timing signal generation section 321, a PN clock generation section 322 in the form of a PLL (Phase-Looked Loop), and a timing signal generation section 323. The horizontal synchronizing timing signal H and the vertical synchronizing timing signal V from the synchronism detection section 31 are supplied to the PN code generation timing signal generation section 321 and the timing signal generation section 323, and the horizontal synchronizing timing signal H from the synchronism detection section 31 is inputted to the PN clock generation section 322.

As described hereinabove with reference to FIGS. 17A to 17D, in the normal process, from a video signal for forming an image PW of the aspect ratio of 16:9, a video signal is formed such that an entire image PW of the aspect ratio of 16:9 is displayed as an image PS in the overall area of a screen GS of the aspect ratio of 4:3 without any miss of a pixel.

Figure 4A:
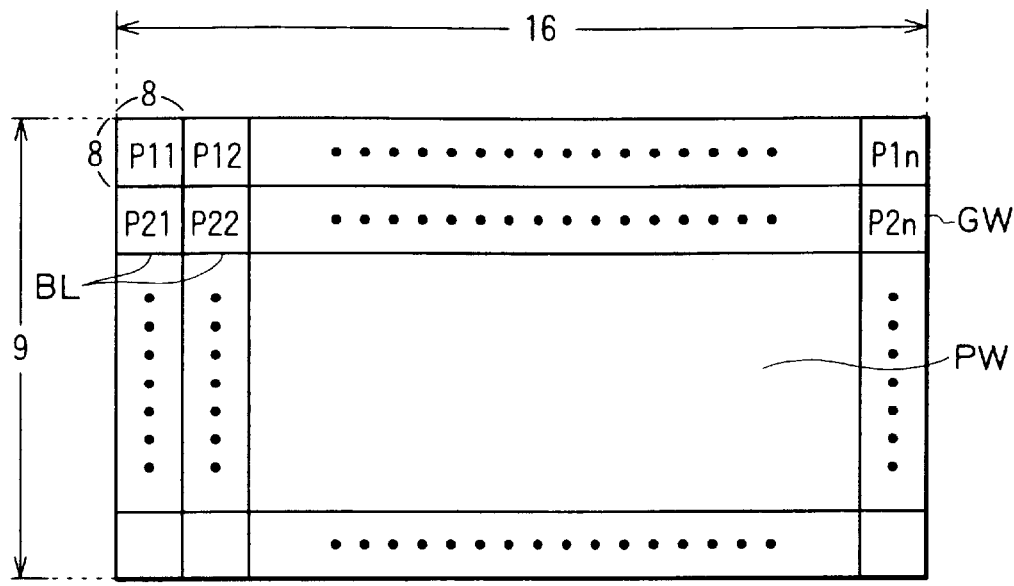
FIGS. 4A and 4B are diagrammatic views illustrating electronic watermark information to be superposed on a video signal to be subject to the normal process and electronic watermark information superposed on a video signal formed by the normal process.
Figure 4B:
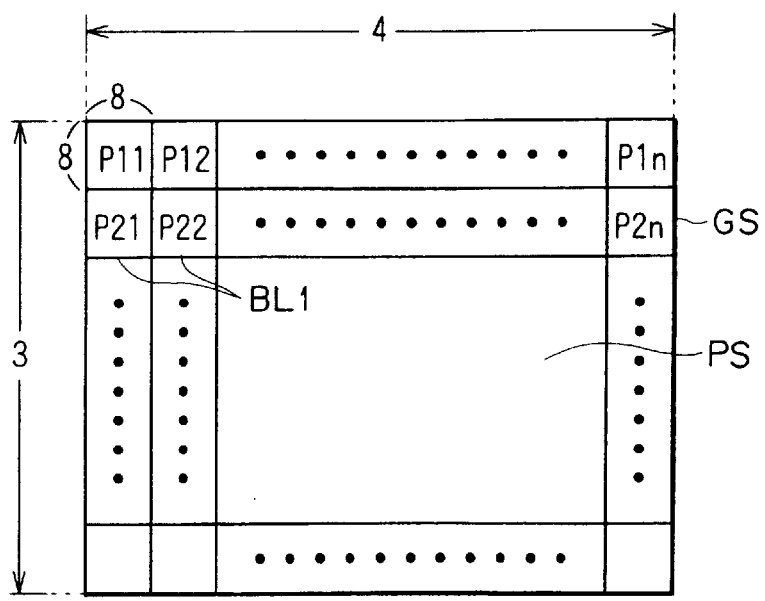

In this instance, referring to FIGS. 4A and 4B, the image PW (refer to FIG. 4A) displayed on a screen GW of the aspect ratio of 16:9 based on a video signal for forming an image of the aspect ratio of 16:9 and the image PS (refer to FIG. 4B) displayed on the screen GS of the aspect ratio of 4:3 based on a video signal for forming an image of the aspect ratio of 4:3 are different only in aspect ratio from each other, but do not undergo decrease of video information by thinning out or increase of video information by interpolation.

Accordingly, in order to make it possible to extract, from a video signal formed by the normal process for forming an image PS of the aspect ratio of 4:3, electronic watermark information superposed on the video signal, special processing need not be performed for a video signal for forming an image PW of the aspect ratio of 16:9, and electronic watermark information spectrum spread with PN codes P11, P12, ..., P1n, P21, P22, ..., P2n allocated for each one vertical period such that one chip thereof is allocated to each unit block BL composed of 8×8 pixels should be superposed on the video signal in synchronism with the vertical synchronizing signal.

Thus, the PN code generation timing signal generation section 321 uses the vertical synchronizing timing signal V as a reference signal to generate a reset signal RE for vertical period which defines a repetition period of a PN code train for spreading to be used for spectrum spreading as seen in FIG. 5A. Here, the reset signal RE is a signal for vertical period which falls, for example, at the leading edge of the vertical synchronizing timing signal V.

Further, the PN code generation timing signal generation section 321 uses the horizontal synchronizing timing signal H (refer to FIG. 5B) as a reference signal to generate a PN generation enable signal EN. Here, the PN generation enable signal EN is generated as a signal for causing PN codes to be generated from the PN code generation section 33 only for one horizontal section after every N lines of the block BL in the vertical direction, here, after every N=8 horizontal sections (refer to FIG. 5D). As seen from FIG. 5D, the PN generation enable signal EN is a low-active signal.

The PN clock generation section 322 is formed from a PLL and generates a clock signal PNCLK (refer to FIG. 5C) of a period equal to that of the block BL in synchronism with the horizontal synchronizing timing signal H. The clock signal PNCLK is a clock signal of a period corresponding to a number of pixels of the block BL in a horizontal direction, here, a clock signal of a period of 8 pixels. The clock signal PNCLK defines a chip period of spread codes.

The timing signal generation section 323 generates various timing signals to be used in the authoring apparatus of FIG. 1 based on the vertical synchronizing timing signal V and the horizontal synchronizing timing signal H.

The PN code generation section 33 generates PN codes in response to the clock signal PNCLK, enable signal EN and reset signal RE. In particular, the PN code generation section 33 is reset in a vertical period in response to the reset signal RE and generates a PN code train PS of a predetermined code pattern beginning with the top of the same. In particular, the PN code generation section 33 generates a PN code train PS in response to the clock signal PNCLK only when it is controlled to a PN code generation enabling state (enable state) by the enable signal EN.

In the present embodiment, since the PN code generation section 33 is controlled to a state wherein it can generate PN codes when the enable signal EN has the low level as described above, it is put into a PN code generation state in the top one horizontal section from among 8 horizontal sections of 1 block in the vertical direction as seen in FIG. 5D, and PN codes are generated at a ratio of one chip for each 1 clock of the clock signal PNCLK. In this instance, since the PN code generation section 33 is not reset within the one vertical section, PN code trains PN11, PN12, PN13, . . . different from one another are generated as seen in FIG. 5E in the PN generation horizontal section.

However, since the PN code generation section 33 is reset at the top of a vertical section by the reset signal RE, in each vertical section, PN code trains PN11, PN12, PN13, . . . different from one another are generated in the top one horizontal sections of the successive unit blocks BL similarly in each vertical section.

The PN code generation section 33 generates M PN code trains PS based on the enable signal EN, clock signal PNCLK and reset signal RE as described above and, though not shown, includes a shift register having a number of stages and several exclusive OR circuits for calculating suitable tap outputs of the shift register.

The PN code train PS from the PN code generation section 33 obtained in this manner is supplied to the PN code repetition section 34. Also the enable signal EN and the clock PNCLK from the PN code generation control section 32 are supplied to the PN code repetition section 34.

Figure 3:
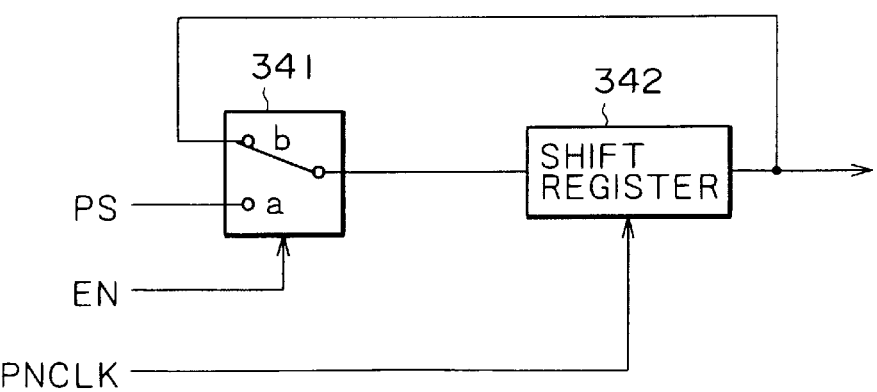
FIG. 3 is a block diagram showing a PN code repetition section shown in FIG. 1.

FIG. 3 shows an example of a construction of the PN code repetition section 34. Referring to FIG. 3, the PN code repetition section 34 includes a switch circuit 341, and a shift register 342 having a number of stages equal to the number of chips of PN codes which can be placed in one horizontal section. The PN code train PS is supplied to an input terminal a of the switch circuit 341 while an output of the shift register 342 is supplied to the other input terminal b of the switch circuit 341.

As a switching signal for the switch circuit 341, the enable signal EN is supplied. Within a section wherein the enable signal EN has the low level and a PN code train PS is generated, the switch circuit 341 is switched to the input terminal a side, but within another section wherein the enable signal EN has the high level and no PN code train PS is generated, the switch circuit 341 is switched to the input terminal b side. The clock signal PNCLK is supplied as a shift clock to the shift register 342.

Accordingly, a PN code train PS including PN code trains PN11, PN12, PN13 . . . generated in the top horizontal sections by the PN code generation section 33 in the blocks BL is supplied to the shift register 342 through the switch circuit 341. In the remaining horizontal sections in the blocks BL, the PN code train PS from the PN code generation section 33 is interrupted. However, since the switch circuit 341 is switched to the input terminal b side which is the output side of the shift register, the shift register 342 repetitively outputs the PN code trains PN11, PN12, PN13, . . . for one horizontal section fetched in the preceding horizontal section.

As described above, the PN code repetition section 34 in the present embodiment repeats a PN code train generated in one horizontal section from among 8 horizontal sections of each block in the following horizontal sections to thus generate a PN code train PSr wherein the PN code trains PN11, PN12, PN13, . . . of a unit of the one horizontal period successively appear in the 8 horizontal sections in each block BL as seen in FIG. 5F. In other words, one chip of the PN code train PS is allocated to one block. The PN code train PSr from the PN code repetition section 34 is supplied to the SS spreading section 35.

The duplication control information generation section 36 generates duplication control information train as additional information to be spectrum spread and superposed on a video signal inputted through the input terminal 1 based on the clock signal PNCLK at a timing of the enable signal EN from the PN code generation control section 32, and outputs the duplication control information in response to the clock signal PNCLK so that it is supplied to the SS spreading section 35. In short, the duplication control information generation section 36 forms a duplication control information train FS at a timing same as that of the PN code train PSr and outputs the duplication control information train FS to the SS spreading section 35.

Which duplication control information should be generated by the duplication control information generation section 36 is controlled with a control signal CT2 from the control section 10. In the present embodiment, the duplication control information generation section 36 generates information of a low bit rate representative of a duplication control condition such as allowance of duplication, inhibition of duplication or allowance of duplication only for one generation as the duplication control information.

The SS spreading section 35 spectrum spreads the duplication control information train FS from the duplication control information generation section 36 using the PN code train PSr to form electronic watermark information (SS duplication control information) to be superposed on the video signal inputted through the input terminal 1.

The electronic watermark information formed by the SS spreading section 35 is supplied to the WM superposition section 2 through the level adjustment section 37. The level adjustment section 37 superposes the electronic watermark information on the video signal to adjust the superposition level of the electronic watermark information so that an image reproduced from the video signal may not be deteriorated. In the present embodiment, the level adjustment section 37 adjusts the level of the electronic watermark information so that the electronic watermark information may be superposed at a level lower than the dynamic range of the video signal. The electronic watermark information of the adjusted level is supplied to the WM superposition section 2.

[Superposition of electronic watermark information corresponding to letter box process]

Electronic watermark information which can be extracted from a video signal formed by the letter box process is superposed in the following manner. In the letter box process, a video signal for displaying an entire image PW of the aspect ratio of 16:9 as an image PSW without changing the aspect ratio in a predetermined area composed of a predetermined plurality of lines in the vertical direction in a screen GS of the aspect ratio of 4:3 as described hereinabove with reference to FIG. 18 is formed.

In this instance, the image PSW (FIG. 6B) of the aspect ratio of 16:9 displayed on the screen GS of the aspect ratio of 4:3 is formed from the video signal (FIG. 6A) for forming the image GW of the aspect ratio of 16:9 by thinning out horizontal sections (horizontal lines) in the vertical direction for each unit block as described hereinabove.

Figure 6A:
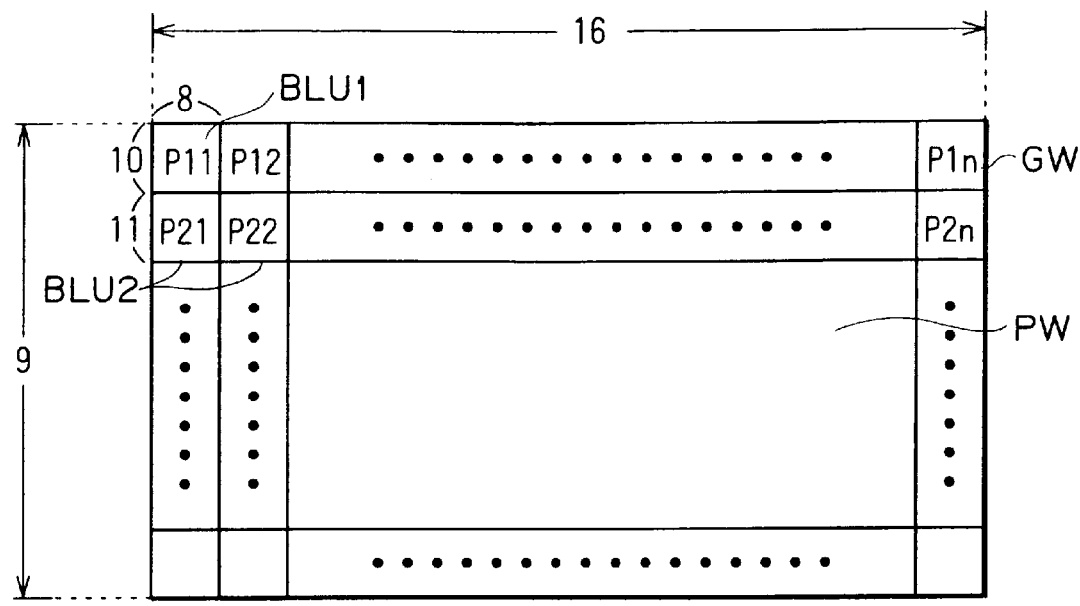
FIGS. 6A and 6B are diagrammatic views illustrating electronic watermark information to be superposed on a video signal to be subject to the letter box process and electronic watermark information superposed on a video signal formed by the letter box process.
Figure 6B:
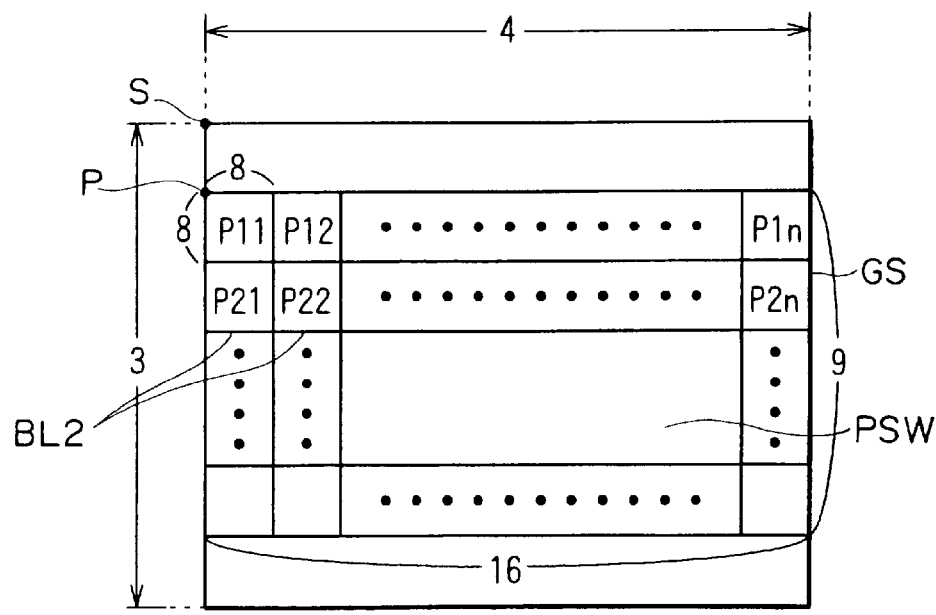

Further, in the present embodiment, since the image PSW of the aspect ratio of 16:9 displayed on the screen GS of the aspect ratio of 4:3 is formed by thinning out horizontal sections in the vertical direction, the displaying start position is displaced from the top horizontal section position S to another position P in FIG. 6B. Consequently, the image PSW of the aspect ratio of 16:9 is displayed at a central position of the screen GS of the aspect ratio of 4:3 in the vertical direction.

Accordingly, in order to make it possible to extract, from a video information formed by the letter box process for forming an image of the aspect ratio of 4:3, electronic watermark information superposed on the video signal, the size of a unit block before conversion is set taking the number of lines to be thinned out by the letter box process from a video signal for forming the image PW of the aspect ratio of 16:9 into consideration.

In the present embodiment, the number of horizontal sections in the vertical direction to be thinned out by the letter box process is 2 to 3 for each unit block. Consequently, the size of a unit block (unit block before conversion) in a video signal for forming the image PW of the aspect ratio of 16:9 is set greater by a magnitude corresponding to the number of horizontal sections to be thinned out.

In the present embodiment, the size of the uppermost unit block BLU1 of a video signal for forming an image PW of the aspect ratio of 16:9 is set to 10 horizontal sections adding 2 horizontal sections to ordinary 8 horizontal sections as seen in FIG. 6A. Meanwhile, the size of the next unit block BLU2 in the vertical direction is set to 11 horizontal sections adding 3 horizontal sections to ordinary 8 horizontal sections. In this manner, where the letter box process is involved, the size of each unit block before conversion is set adding the number of horizontal sections to be thinned out for each unit block.

Further, for each unit block before conversion whose number of lines in the vertical direction has been increased in this manner, electronic watermark information spectrum spread with spread codes P11, P12, . . . , P1n, P21, P22, . . . , P2n allocated to each one block should be superposed on a video signal for forming an image PW of the aspect ratio of 16:9.

It is to be noted that, where the letter box process is presumed, since the number of horizontal sections (number of horizontal lines) in the vertical direction per one block increases by 2 or 3, the number of blocks before conversion in the vertical direction to which PN codes for one chip are allocated is different from that where the normal process described above is presumed. In short, the number of blocks before conversion in the vertical direction is smaller where the letter box process is presumed than where the normal process is presumed.

In this instance, the PN code generation timing signal generation section 321 uses, similarly for a video signal formed by the normal process described above, the vertical synchronizing timing signal V as a reference signal to generate a reset signal RE of the vertical period which defines a repetition period of the PN code train for spreading to be used for spectrum spreading as seen from FIG. 7A.

The PN code generation timing signal generation section 321 uses the horizontal synchronizing timing signal H (refer to FIG. 7B) as a reference signal to generate the PN generation enable signal EN. In the present embodiment, the PN generation enable signal EN is formed as a signal for causing PN codes to be generated from the PN code generation section 33 only in the top horizontal section in the vertical direction of the unit blocks before conversion BLU1, BLU2, . . . whose sizes have been set (refer to FIG. 7D).

In short, in the present embodiment, the PN generation enable signal is generated as a signal which causes, since the line number of the block BLU1 in the vertical direction is 10 horizontal sections, PN codes for one horizontal section to be generated in the top horizontal section from among the 10 horizontal sections, but causes, since the line number of the block BLU2 in the vertical direction is 11 horizontal sections, PN codes for one horizontal section to be generated in the top horizontal section from among the 11 horizontal sections (refer to FIG. 7D). As seen from FIG. 7D, the PN generation enable signal EN is a low-active signal.

The PN clock generation section 322 includes a PLL and generates a clock signal PNCLK (refer to FIG. 7C) of a period of a unit block before conversion in synchronism with the horizontal synchronizing timing signal H. The letter box process does not involve thinning out or interpolation of pixels in each horizontal section. Therefore, also in the present embodiment, the clock signal PNCLK is a clock signal of a period of the number of pixels of a unit block before conversion in the horizontal direction, that is, a period of 8 pixels.

The PN code generation section 33 generates PN codes in response to the clock signal PNCLK (FIG. 7C), the PN generation enable signal EN (FIG. 7D) and the reset signal RE (FIG. 7A). In particular, the PN code generation section 33 is reset in a vertical period with the reset signal RE and generates a PN code train PS of a predetermined code pattern beginning with the top of it. The PN code generation section 33 generates the PN code train PS (FIG. 7E) in response to the clock signal PNCLK only when it is controlled to a PN code generation allowing condition with the enable signal EN.

In this instance, since the PN code generation section 33 is put into a condition wherein it can generate PN codes when the PN generation enable signal EN has the low level as described hereinabove, it is put into a PN code generation condition within the top one horizontal section from among the 10 horizontal sections or the 11 horizontal sections of one block in the vertical direction as shown in FIG. 7D, and generates PN codes at a ratio of 1 chip for each 1 clock of the clock signal PNCLK. In this instance, since the PN code generation section 33 is not reset in one vertical section, PN code trains PN11, PN12, PN13, . . . different from one another are generated in the PN generation horizontal section described above as shown in FIG. 7E.

Since the PN code generation section 33 is reset at the top of a vertical section with the reset signal RE as described above, PN code trains PN11, PN12, PN13, . . . different from one another are generated similarly in the top one horizontal section of each unit block BL in each vertical section.

The PN code train PS from the PN code generation section 33 obtained in this manner is supplied to the PN code repetition section 34. Also the enable signal EN and the clock signal PNCLK from the PN code generation control section 32 are supplied to the PN code repetition section 34 as described hereinabove.

In the PN code repetition section 34, the PN code train PS formed from the PN code trains PN11, PN12, PN13, . . . generated in the top horizontal section in each unit block before conversion is transferred to the shift register 342 through the switch circuit 341. Consequently, in the remaining horizontal sections in each unit block before conversion, although the PN code train PS from the PN code generation section 33 is interrupted, since the switch circuit 341 is switched to the input terminal b side which is the output side of the shift register, the shift register 342 repeats the PN code trains PN11, PN12, PN13, . . . for one horizontal section fetched in the preceding horizontal section by a number corresponding to the number of horizontal sections of each unit block before conversion in the vertical direction.

As described above, the PN code repetition section 34 produces a PN code train PSr wherein a PN code train generated in the top horizontal section from among a plurality of horizontal sections of each unit block before conversion in the vertical direction is repeated in the following horizontal sections in the unit block before conversion such that PN code trains PN11, PN12, PN13, . . . of a unit of the one horizontal section successively appear in the plurality of horizontal sections of the unit block before conversion in the vertical direction as shown in FIG. 7F. In other words, one chip of the PN code train PS is allocated to one block.

The PN code train PSr from the PN code repetition section 34 is supplied to the SS spreading section 35. The SS spreading section 35 spectrum spreads the duplication control information train FS from the duplication control information generation section 36 with the PN code train PSr from the PN code repetition section 34 and supplies resulting information to the WN superposition section 2 through the level adjustment section 37.

[Superposition of electronic watermark information corresponding to pan scan process]

Superposition of electronic watermark information which can be extracted from a video signal formed by the pan scan process is performed in the following manner. Where the pan scan process is involved, an image PB of a predetermined region to be displayed on a screen of the aspect ratio of 4:3 from within an image PW of the aspect ratio of 16:9 to be displayed on a screen GW of the aspect ratio of 16:9 is cut out, and a video signal for displaying the thus cut out image PB as an image PBS on the screen GS of the aspect ratio of 4:3 is generated.

In this instance, the image PBS (FIG. 8B) of the aspect ratio of 4:3 to be displayed on the screen GS of the aspect ratio of 4:3 is formed from the image PB of a portion in the horizontal direction of the original video signal (FIG. 8A) for forming the image GW of the aspect ratio of 16:9. In this instance, since the information of the cut out image PB in the horizontal direction is insufficient for one horizontal section, it is interpolated with 2 pixels for each unit block in the horizontal direction to form a video signal for forming an image of the aspect ratio of 4:3.

Accordingly, in order to make it possible to extract, from a video signal formed by the pan scan process for forming an image of the aspect ratio of 4:3, electronic watermark information superposed on the video signal, the position and the size of a unit block before conversion of a video signal for forming an image of the aspect ratio of 16:9 are set taking the position of the image PB to be cut out and the number of pixels interpolated for each line in the horizontal direction in the video signal for forming the image PW of the aspect ratio of 16:9 into consideration.

In the present embodiment, the number of pixels in each horizontal section to be interpolated by the pan scan process is 2 for each horizontal line of each unit block. Therefore, the size of a unit block (unit block before conversion) of a video signal for forming an image PW of the aspect ratio of 16:9 is set smaller by the number of pixels to be interpolated in the horizontal direction.

Figure 8A:
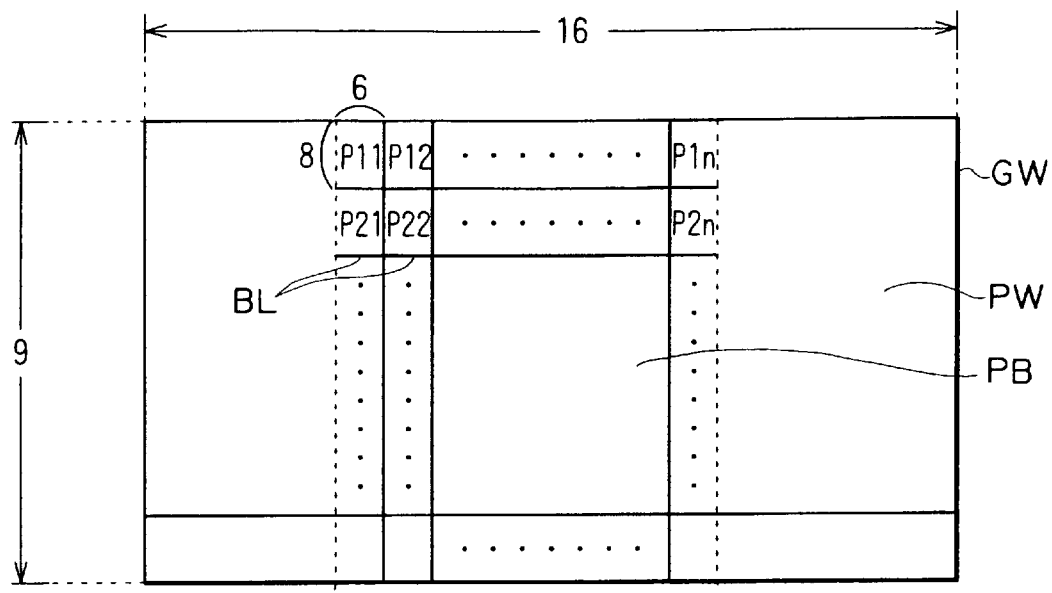
FIGS. 8A and 8B are diagrammatic views illustrating electronic watermark information to be superposed on a video signal to be subject to the pan scan process and electronic watermark information superposed on a video signal formed by the pan scan process.
Figure 8B:
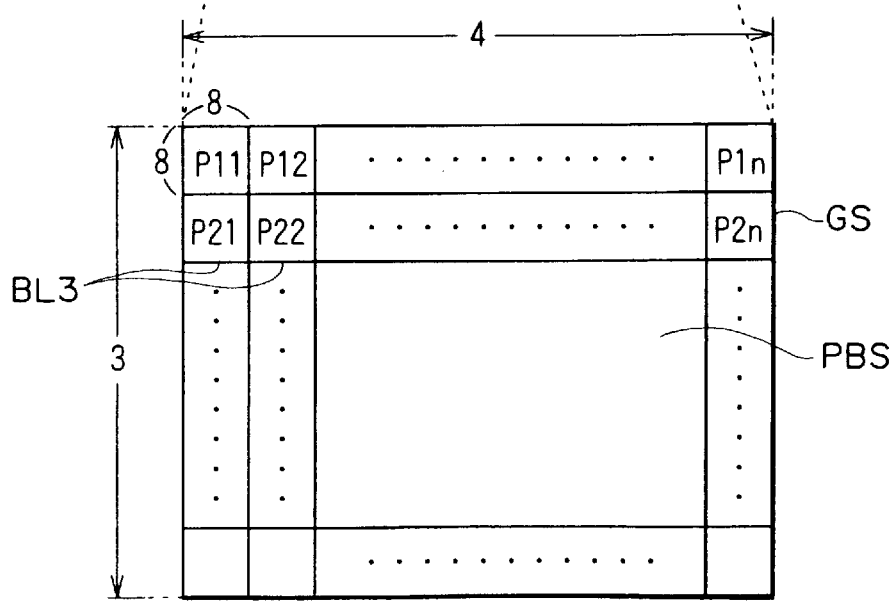

In the present embodiment, as shown in FIG. 8A, the position of the image PB to be cut out from a video signal for forming an image PW of the aspect ratio of 16:9 is determined in advance. For example, a portion of the image PW except an image for 90 pixels in the horizontal direction from the left end and another image for 90 pixels in the horizontal direction from the right end of the image PW is decided to be the image PB to be cut out.

To this end, a unit block BL before conversion is set corresponding to the position of the image PB to be cut out from a video signal for forming the image PW of the aspect of 16:9 as shown in FIG. 8A. In this instance, taking it into consideration that, when the pan scan process is performed, 2 pixels are interpolated in the horizontal direction for each unit block, the number of pixels of a unit block before conversion in the horizontal direction is set to 6 decreasing the number of pixels of a unit block in the horizontal direction, which is normally 8, by 2 pixels. In this manner, when the pan scan process is performed, the size of a unit block before conversion is set lower by the number of pixels to be interpolated in the horizontal direction for each unit block.

Then, for each unit block before conversion whose pixel number in the horizontal direction is decreased, electronic watermark information spectrum spread with spread codes P11, P12, . . . , P1n, P21, P22, . . . , P2n which are allocated for one chip should be superposed on a video signal in a portion which forms the image PB to be cut out from the image PW of the aspect ratio of 16:9.

Thus, in this instance, the PN code generation timing signal generation section 321 uses the vertical synchronizing timing signal V as a reference signal, similarly as for a video signal formed by the normal process or letter box process described above, to generate a reset signal RE of a vertical period which defines a repetition period of a PN code train for spreading to be used for spectrum spreading as shown in FIG. 9A.

Then, the PN code generation timing signal generation section 321 uses the horizontal synchronizing timing signal H (refer to FIG. 7B) and the pixel clock signal as reference signals to generate a PN generation enable signal EN. In the pan scan process, the image PB is cut out from the image PW of the aspect ratio of 16:9 and an image for displaying the thus cut out image PB on a screen GS of the aspect ratio of 4:3 is formed.

Therefore, electronic watermark information must be superposed on a video signal in a portion for forming the image PB to be cut out. However, the position of the image PB to be cut out from a video signal for forming the image PW of the aspect ratio of 16:9 is determined in advance. In the present embodiment, for example, a portion of the image PW except an image for 90 pixels in the horizontal direction from the left end and another image for 90 pixels in the horizontal direction from the right end of the image PW is determined as the image PB to be cut out.

Therefore, the PN code generation timing signal generation section 321 counts a pixel clock (FIG. 10B) obtained by dividing the horizontal synchronizing timing signal H (FIG. 10A) to form an enable signal EN (FIG. 10D) for allowing PN codes to be generated only in a portion of each horizontal section for forming the image PB to be cut out except the front and rear ranges for 90 pixels. The enable signal EN is formed as a signal for allowing PN codes to be generated by the PN code generation section 33 only in the top horizontal section of each unit block BL before conversion in the vertical direction (refer to FIG. 9D).

The PN clock generation section 322 includes a PLL and generates a clock signal PNCLK (refer to FIG. 9C) of a period of a unit block BL before conversion in synchronism with the horizontal synchronizing timing signal H. In the pan scan process, since pixels in each horizontal section are interpolated in such a manner as described above, taking this into consideration, two pixels of a unit block before conversion in the horizontal direction are subtracted in advance. Accordingly, the clock signal PNCLK is a clock signal of a period of the number of pixels of a unit block before conversion in the horizontal direction, that is, a period of 6 pixels.

The PN code generation section 33 generates PN codes in response to the clock signal PNCLK (FIG. 9C), the enable signal EN (FIG. 9D) and the reset signal RE (FIG. 9A). In particular, also in this instance, the PN code generation section 33 is reset in a vertical period with the reset signal RE and generates a PN code train PS of a code pattern determined in advance from the beginning of the same. Here, the PN code generation section 33 generates the PN code train PS (FIG. 9E) in response to the clock signal PNCLK only when it is controlled to a PN code generation enabling condition with the enable signal EN.

In this example, since the PN code generation section 33 is put into a condition wherein it can generate PN codes only when the enable signal EN has the low level as described hereinabove, it is controlled to a PN code generation condition at a portion of a video signal for forming an image PB to be cut out in the top one horizontal section of each unit block before conversion in the vertical direction and generates PN codes at a ratio of one chip for each one clock of the clock signal PNCLK as shown in FIG. 9D. In this instance, since the PN code generation section 33 is not reset within one vertical section, PN code trains PN11, PN12D PN13, . . . different from one another are generated in the PN generating horizontal section described above as shown in FIG. 9E.

Since the PN code generation section 33 is reset at the top of a vertical period with the reset signal RE as described above, PN code trains PN11, PN12, PN13, . . . different from one another are generated in a portion of the image PB to be cut out within the top one horizontal section of each unit block BL similarly in each vertical section.

The PN code train PS from the PN code generation section 33 obtained in this manner is supplied to the PN code repetition section 34. Also the enable signal EN and the clock signal PNCLK from the PN code generation control section 32 are supplied to the PN code repetition section 34 as described hereinabove.

Then, in the PN code repetition section 34, the PN code train PS including the PN code trains PN11, PN12, PN13, . . . generated in the portion of the image PB to be cut out within the top horizontal section in a unit block before conversion is transferred to the shift register 342 through the switch circuit 341. Consequently, in the remaining horizontal sections in each unit block before conversion, the PN code train PS from the PN code generation section 33 is interrupted, but since the switch circuit 341 is switched to the input terminal b side which is the output side of the shift register, the shift register 342 repetitively outputs the PN code trains PN11, PN12, PN13, . . . generated in the portion of the video signal for forming the image PB to be cut out within one horizontal section fetched in the preceding horizontal section for a number of horizontal sections of each unit block before conversion in the vertical direction.

In this manner, the PN code repetition section 34 produces a PN code train PSr wherein a PN code train generated in a portion of a video signal for forming an image PB to be cut out within the top horizontal section from among a plurality of horizontal sections of each unit block before conversion in the vertical direction is repeated in the following horizontal sections in each unit block before conversion such that PN code trains PN11, PN12, PN13, . . . are generated in the plurality of horizontal sections of each unit block before conversion in the vertical direction in each unit block before conversion as shown in FIG. 9F. In other words, one chip of the PN code train PS is allocated to one block before conversion provided in response to the image PB to be cut out.

The PN code train PSr from the PN code repetition section 34 is supplied to the SS spreading section 35. The SS spreading section 35 spectrum spreads the duplication control information train FS from the duplication control information generation section 36 with the PN code train PSr from the PN code repetition section 34 and supplies resulting information to the WM superposition section 2 through the level adjustment section 37.

Then, as described above, the PN code generation control section 32 in the present embodiment superposes electronic watermark information which can be extracted from a video signal formed by the normal process varying the enable signal EN and clock signal PNCLK for each one frame or from a video signal for forming an image of the aspect ratio of 16:9, electronic watermark information which can be extracted from a video signal formed by the letter box process and electronic watermark information which can be extracted from a video signal formed by the pan scan process.

FIG. 11 is a flow chart illustrating a flow of superposition processing of electronic watermark information corresponding to the normal process, letter box process and pan scan process performed time-divisionally by the authoring apparatus of the present embodiment.

The processing illustrated in FIG. 11 is executed as interrupt processing in a unit of one frame after a recording starting instruction is supplied, for example, from a user of the authoring apparatus to the control section 10.

In the present embodiment, the superposition processing of electronic watermark information time-divisionally superposes electronic watermark information corresponding to the normal process, electronic watermark information corresponding to the letter box process and seselectronic watermark information corresponding to the pan scan process in order for each one frame. To this end, the control section 10 has information representing corresponding to which one of the processes a superposition process of electronic watermark information has been performed in the preceding processing.

The control section 10 first detects the preceding superposition routine based on the information held by the control section 10 itself (step S101). Then, the control section 10 determines what is the next superposition routine based on a result of the detection of the preceding routine (step S102).

If it is determined in the determination processing in step S102 that the next superposition process corresponds to the letter box process, then the control section 10 control the PN code generation control section 32 to perform a superposition process of electronic watermark information corresponding to the letter box process as described hereinabove (step S103).

If it is determined in the determination processing in step S102 that the next superposition process corresponds to the pan scan process, then the control section 10 controls the PN code generation control section 32 to perform a superposition process of electronic watermark information corresponding to the pan scan process as described hereinabove (step S104).

If it is determined in the determination processing in step S102 that the next superposition process corresponds to the normal process, then the control section 10 controls the PN code generation control section 32 to perform a superposition process of electronic watermark information corresponding to the normal process as described hereinabove (step S105).

In this manner, the authoring apparatus of the present embodiment forms electronic watermark information which can be extracted from a video signal formed by the normal process and from a video signal for forming an image of the aspect ratio of 16:9, electronic watermark information which can be extracted from a video signal formed by the letter box process, and electronic watermark information which can be extracted from a video signal formed by the pan scan process such that they are different for each one frame, and supplies them to the WM superposition section 2.

The WM superposition section 2 superposes the electronic watermark information (SS duplication control information) supplied thereto through the level adjustment section 37 on a video signal supplied thereto through the input terminal 1. The WM superposition section 2 supplies the video signal on which the electronic watermark information is superposed to the data compression processing section 4.

The data compression processing section 4 compresses the video signal supplied thereto in accordance with the MPEG system. In the present embodiment, in order to add duplication control signal of the CGMS (Copy Generation Management System) system on the compressed video signal, the compressed video signal is supplied to the CGMS information addition section 5.

In the CGMS system, for example, if the video signal is an analog image signal, then additional information of 2 bits for duplication control is superposed on a particular one horizontal section in a vertical blanking period of the analog image signal, but if the video signal is a digital image signal, then additional information of 2 bits (hereinafter referred to as CGMS information) for duplication control is added to the digital image data.

The CGMS information addition section 5 adds the CGMS information supplied thereto from the CGMS information generation section 6 on the compressed digital video signal. The CGMS information generation section 6 generates CGMS information to be added to the video signal to be transmitted based on a control signal CT3 from the control section 10. The CGMS information generated by the CGMS information generation section 6 signifies one of these "permission of duplication [00]", "permission of duplication once [10]" and "inhibition of duplication [11]".

The video signal to which the CGMS information has been added by the CGMS information addition section 5 is supplied to the encipherment section 7. In the present embodiment, the encipherment section 7 performs an encipherment process of the CSS (Contents Scramble System) system for the video signal. The encipherment process of the CSS system is performed for an information signal such as a video signal when the information signal is recorded onto and provided as a disk medium such as a DVD.

The video signal after the encipherment process has been performed therefor by the encipherment section 7 is supplied to the recording processing section 8. The recording processing section 8 performs adjustment processing and so forth for the video signal supplied thereto and records the video signal onto the DVD 100.

Consequently, the video signal for forming an image of the aspect ratio of 16:9 on which the spectrum spread duplication control information is superposed as electronic watermark information and to which the CGMS information is added is recorded onto the DVD 100, and the DVD 100 obtained in this manner is provided as a medium to a user. In this instance, the video signal recorded on the DVD 100 for forming an image of the aspect ratio of 16:9 forms one frame (1 screen) which includes, for example, 720 pixels in the horizontal direction and 480 lines in the vertical direction.

In this instance, electronic watermark information (SS duplication control information) which is spectrum spread duplication control information does not deteriorate a video signal when it is superposed on the video signal, and it is difficult to remove or modify the electronic watermark information superposed on the video signal. Therefore, the electronic watermark information can be supplied with certainty to a recording apparatus or a reproduction apparatus together with the information signal which becomes an object of duplication control, and the apparatus receiving the electronic watermark information can effect reliable duplication control or reproduction control by detecting the electronic watermark information (SS duplication control information).

Figure 12A:
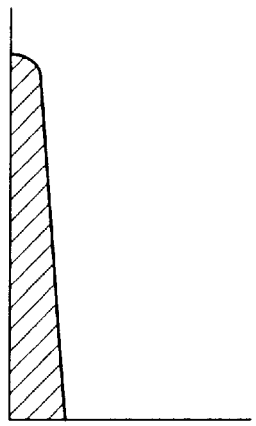
FIGS. 12A to 12D are diagrammatic views illustrating a relationship among an information signal, duplication control information and spectrum spread duplication control information.
Figure 12B:
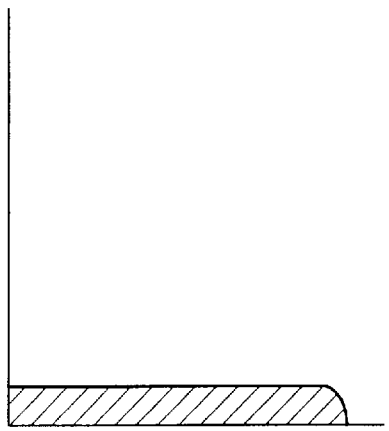

FIGS. 12A to 12D illustrate a relationship between duplicate control information spectrum spread and superposed as electronic watermark information and a video signal in the form of a spectrum. The duplication control signal is a low bit rate signal containing a small amount of information and is a narrow-band signal as shown in FIG. 12A. If spectrum spreading is performed for the duplication control information, then such a broad-band signal as shown in FIG. 12B is obtained. Thereupon, the spectrum spread signal level decreases in an inverse proportional relationship to the ratio of expansion of the band.

Figure 12C:
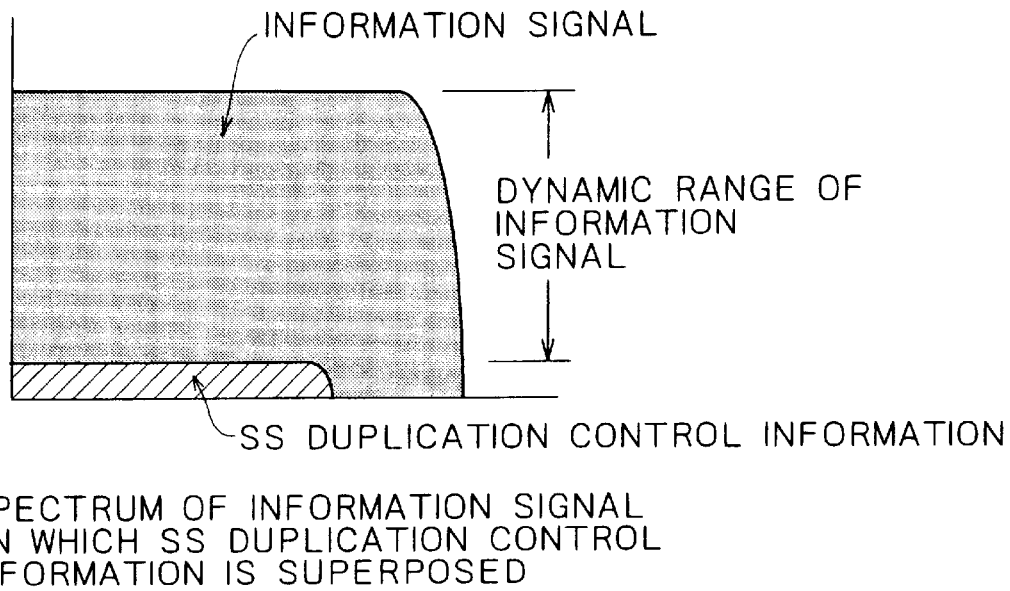

The spectrum spread signal, that is, the electronic watermark information (SS duplication control information), is superposed on a video signal by the WM superposition section 2. In this instance, the electronic watermark information is superposed with a level lower than the dynamic range of the video signal as an information signal as shown in FIG. 12C. Where the electronic watermark information is superposed in this manner, the main information signal little suffers from deterioration. Accordingly, when the video signal on which the electronic watermark information is superposed is supplied to a monitor receiver and an image is reproduced from the video signal on the monitor receiver as described above, the image exhibits little influence of the electronic watermark information. Thus, a good reproduction image can be obtained.

Figure 12D:
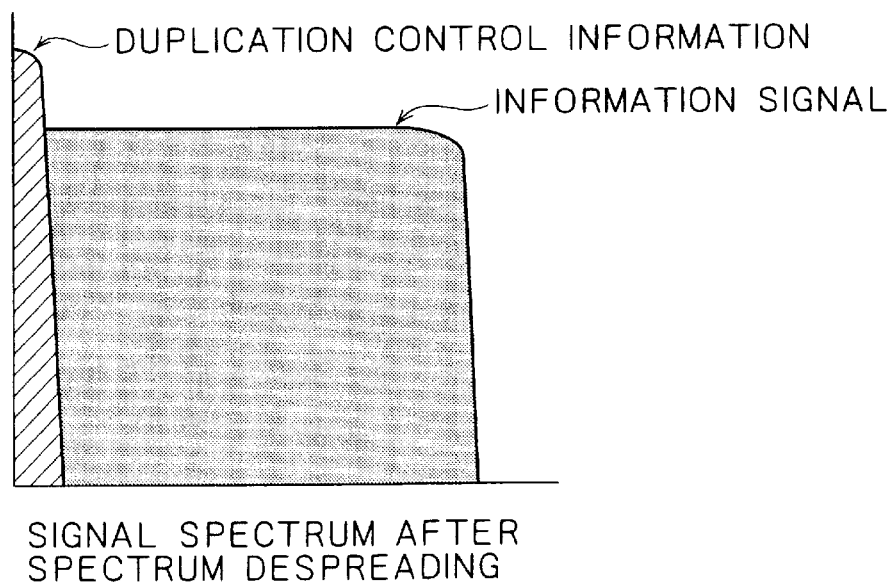

However, if spectrum despreading is performed for the video signal in order to detect the electronic watermark information, then the electronic watermark information is restored as a narrow-band signal as shown in FIG. 12D. If a sufficient band expansion ratio is provided, then the power of the despread duplication control information becomes higher than that of the information signal so that it can be detected.

In this instance, since the electronic watermark information superposed on the video signal is superposed within the same frequency for the same time as the video signal, it cannot be deleted or modified by frequency filtering or mere replacement of information.

Accordingly, since the SS control information superposed on the video signal is not removed and cannot be modified readily, duplication control which can prevent illegal duplication with certainty can be achieved.

The authoring apparatus of the present embodiment performs spectrum spreading using a PN code train of a vertical period with a vertical synchronizing signal used as a reference signal. Further, even if a video signal for forming an image of the aspect ratio of 16:9 is converted into another video signal for forming an image of the aspect ratio of 4:3 by the normal process, letter box process or pan scan process described above, PN codes with which electronic watermark information is to be spectrum spread are allocated to a unit block after conversion of 8×8 pixels in the video signal after conversion.

In short, even if a video signal for forming an image of the aspect ratio of 16:9 is converted into another video signal for forming another image of the aspect ratio of 4:3, the size of a unit block after conversion upon extraction of electronic watermark information is always 8×8 pixels and fixed.

Accordingly, even if a video signal recorded on the DVD 100 for forming an image of the aspect ratio of 16:9 is converted into and outputted as another signal for forming an image of the aspect ratio of 4:3, for example, a recording apparatus which receives the video signal after conversion can produce PN codes for despreading readily based on a signal detected from the video signal after conversion and synchronized with the vertical synchronizing signal, and electronic watermark information can be extracted without changing the electronic watermark information extraction method. Then, duplication control of the video signal after the conversion can be performed appropriately based on the extracted electronic watermark information.

[Reproduction Apparatus]

Figure 13:
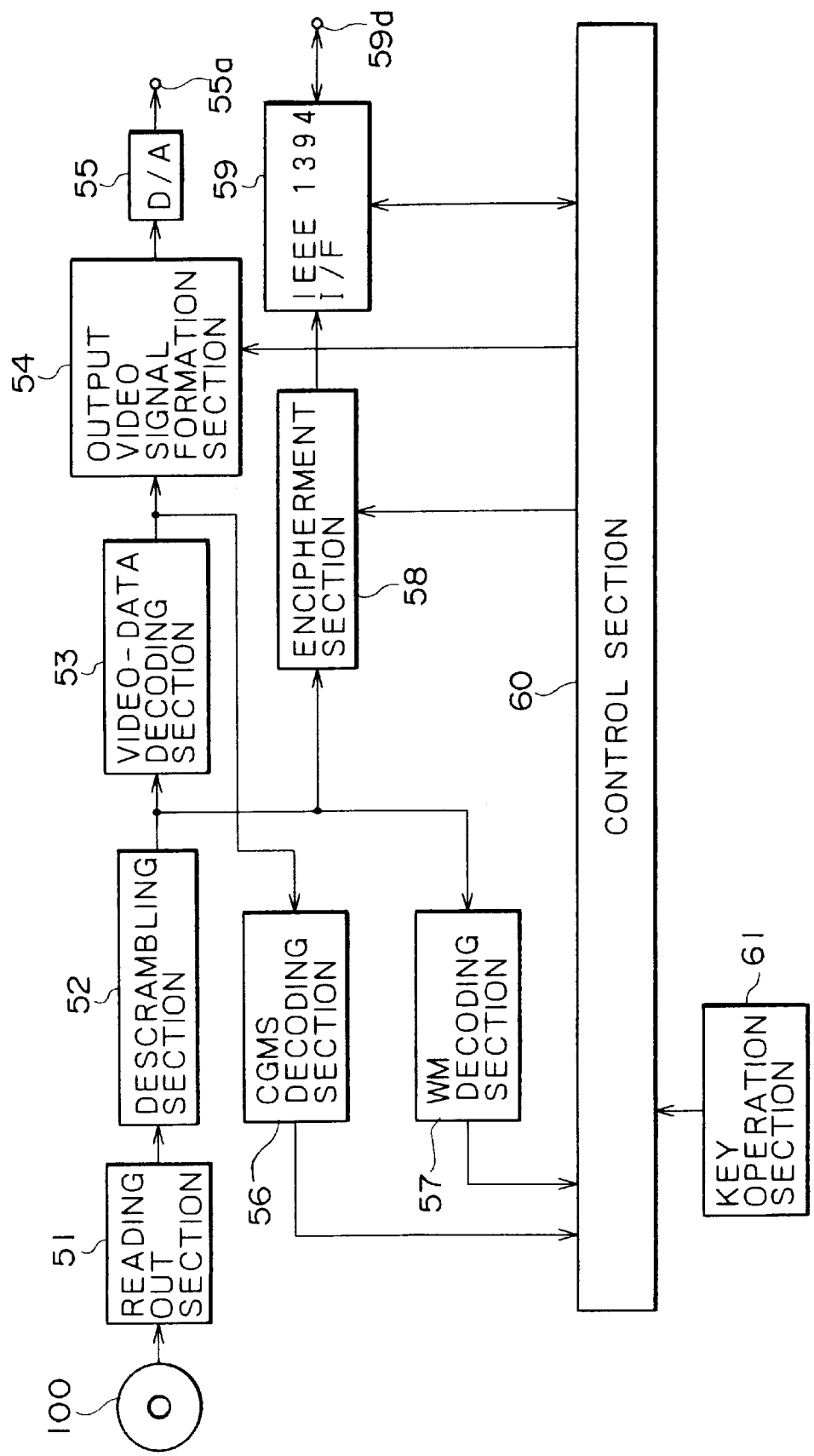
FIG. 13 is a block diagram showing a reproduction apparatus which forms and outputs a video signal having a different aspect ratio.

FIG. 13 is a block diagram showing a reproduction apparatus for a DVD which reproduces and outputs a video signal recorded on a DVD produced by the authoring apparatus described above.

As described above, a video signal with electronic watermark information superposed thereon for forming an image of the aspect ratio of 16:9 is recorded on the DVD 100. Therefore, the reproduction apparatus shown in FIG. 13 has a mode in which a video signal for forming an image of the aspect ratio of 4:3, which can be supplied to a monitor receiver popularly spread at present and having a frame of the aspect ratio of 4:3, is formed from another video signal for forming another image of the aspect ratio of 16:9.

The reproduction apparatus shown in FIG. 13 has, as a mode of converting a video signal for forming an image of the aspect ratio of 4:3 into another video signal for forming another image of the aspect ratio of 4:3, a normal mode in which the normal process is performed, a letter box mode in which the letter box process is performed, and a pan scan mode in which the pan scan process is performed.

Which one of the normal mode, letter box mode and pan scan mode should be used is selectively determined by a user of the reproduction apparatus and can be inputted to the reproduction apparatus through a key operation section connected to a control section.

Referring to FIG. 13, if a reproduction instruction of a video signal recorded on the DVD 100 is provided by the user, then a video signal read out from the DVD 100 by reading out section 51 is supplied to a descrambling section 52, by which a descrambling process for canceling the scramble of the read out video signal is performed.

The video signal obtained by the descrambling process is supplied to a video data decoding section 53. Since the video signal obtained by the descrambling process is in an MPEG compressed state, it is MPEG decoded and decompressed by the video data decoding if section 53 so that it can be supplied, for example, to a display monitor unit. The MPEG decoded video signal is supplied to an output video signal formation section 54.

The output video signal formation section 54 forms a video signal to be outputted based on selection instruction information for selecting one of the normal mode, letter box mode and pan scan mode inputted thereto through a key operation section 61.

In particular, when the selection instruction of the user designates the normal mode, the output video signal formation section 54 forms, from the video signal for forming an image PW of the aspect ratio of 16:9, another video signal for allowing the entire image PW of the aspect ratio of 16:9 to be displayed as an image PS on an overall screen GS of the aspect ratio of 4:3 without any miss of the image PW of the aspect ratio of 16:9 as described hereinabove with reference to FIGS. 17A to 17D.

However, when the selection instruction of the user designates the letter box mode, the output video signal formation section 54 forms a video signal for allowing an entire image PW of the aspect ratio of 16:9 to be displayed as an entire image PSW without changing the aspect ratio in a predetermined area formed from a predetermined plurality of lines in the vertical direction in the screen GS of the aspect ratio of 4:3 as described hereinabove with reference to FIGS. 18A to 18D.

In this instance, the reproduction apparatus thins out, if the image PW of the aspect ratio of 16:9 includes 480 horizontal lines, 2 horizontal sections or 3 horizontal sections in the vertical direction of each unit block of 10×8 pixels or 11×8 pixels so that an image PSW of the aspect ratio of 16:9 including 360 horizontal lines may be displayed in the screen GS of the aspect ratio of 4:3.

On the other hand, if the instruction of the user designates the pan scan mode, then the output video signal formation section 54 cuts out an image PB of a portion of an image PW of the aspect ratio of 16:9 and forms a video signal such that the image PB may be displayed on an entire screen GS of the aspect ratio of 4:3 as described hereinabove with reference to FIGS. 19A to 19D and 20A to 20C.

More particularly, in the present reproduction apparatus, the output video signal formation section 54 cuts out an image portion PB from an image PW of the aspect ratio of 16:9 to be displayed on a screen of the aspect ratio of 16:9 except an image for 90 pixels on the right side in the horizontal direction from the left end and another image for 90 pixels on the left side in the horizontal direction from the right end of the image PW, and forms a video signal for forming the thus cut out image PB as an image PBS of the aspect ratio of 4:3.

In this instance, the video signal for displaying the image PW of the aspect ratio of 16:9 is the video signal recorded on the DVD as described above, and includes 720 pixels in the horizontal direction and 480 lines (or pixels) in the vertical direction. Therefore, the reproduction apparatus cuts out an image PB including 540 pixels in the horizontal direction and 480 lines in the vertical direction with reference to the center in the horizontal direction of the image PW of the aspect ratio of 16:9.

The thus cut out image PB is interpolated with pixels in each horizontal section as described above so that it is converted into a video signal for forming an image of the aspect ratio of 4:3 including, for example, 720 pixels in the horizontal direction and 480 lines in the vertical direction.

The video signal from the output video signal formation section 54 formed in accordance with the instruction of the user in this manner is converted into an analog signal by a D/A converter 55 and supplied, for example, to a display monitor unit or a recording apparatus through an analog output terminal 55a.

Further, the reproduction apparatus can digitally output video data in an MPEG compressed form from the descrambling section 52 through an interface bus of the IEEE 1394 standards.

The interface of the IEEE 1394 standards performs encipherment for transmission digital signal in order to prevent illegal duplication. Further, the interface verifies whether or not the outputting destination is a compliant apparatus and further verifies CGMS information and/or electronic watermark information as information for duplication control, and decides, based on a result of the verification, whether or not a key for deciphering the enciphered information should be sent out to the outputting destination.

The communication control system described above is called IEEE 1934 secure bus and allows achievement of effective prevention of duplication.

The video signal outputted from the descrambling section 52 is supplied to a CGMS decoding section 56, by which the CGMS information added to the video signal is extracted. The CGMS information is extracted as information of 2 bits at a particular position separate from video data by the CGMS decoding section 56, and the 2-bit information is supplied to a control section 60.

Meanwhile, the video data MPEG decoded by the video data decoding section 53 are supplied to an electronic watermark information decoding section (hereinafter referred to as WM decoding section) 57, by which the electronic watermark information added to the video data is extracted. The electronic watermark data is superposed as a spectrum spread signal on the information signal as described hereinabove.

In particular, as described hereinabove, the video signal recorded on the DVD 100 for forming an image of the aspect ratio of 16:9 has superposed thereon electronic watermark information which can be extracted from a video signal formed by the normal process and from a video signal for forming an image of the aspect ratio of 16:9, electronic watermark information which can be extracted from a video signal formed by the letter box process and electronic watermark information which can be extracted from a video signal formed by the pan scan process, such that they are different from each other for each one frame.

Accordingly, the present reproduction apparatus can extract electronic watermark information from a video signal recorded on the DVD 100 for forming an image of the aspect ratio of 16:9. In this instance, the reproduction apparatus synchronizes PN codes to be used as spread codes with a vertical synchronizing signal, allocates one PN code to a unit block of 8×8 pixels in a vertical period and extracts the spectrum spread electronic watermark information using the PN codes.

Figure 14:
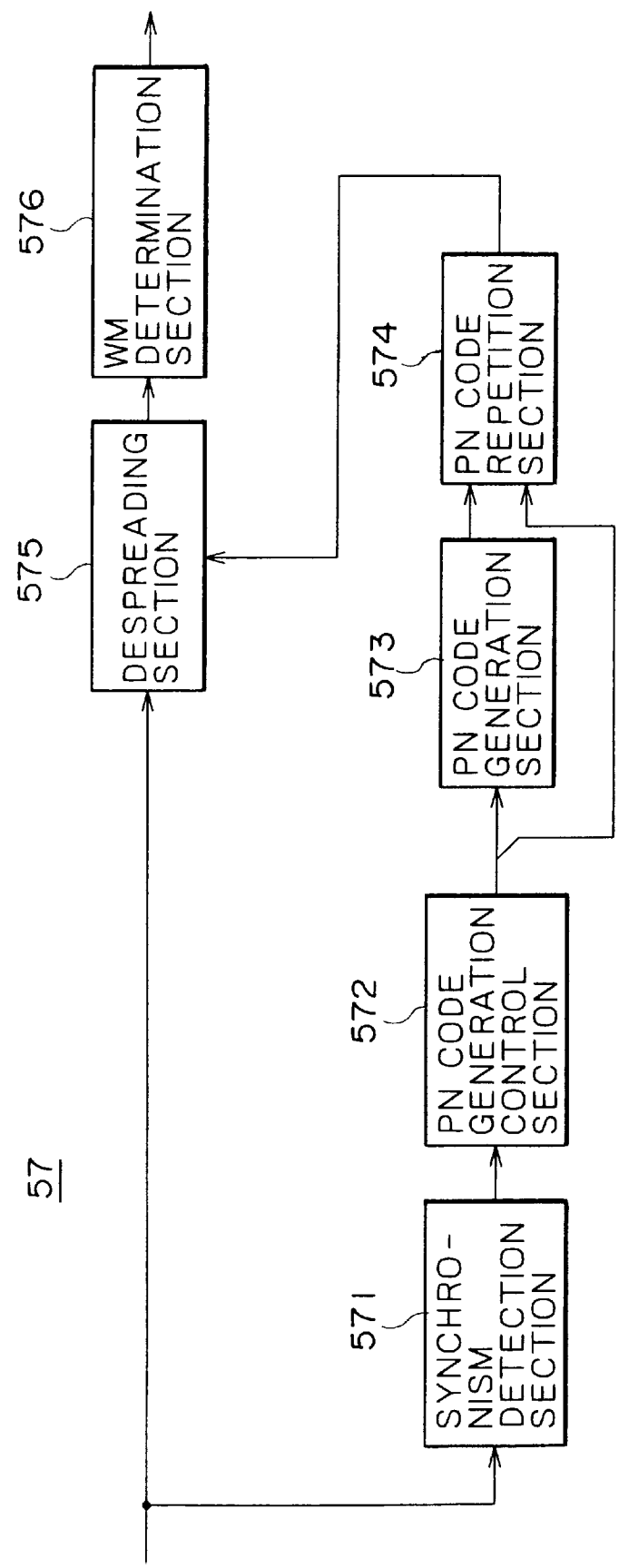
FIG. 14 is a block diagram showing a WM decoding section of the reproduction apparatus shown in FIG. 13.
Figure 20A:
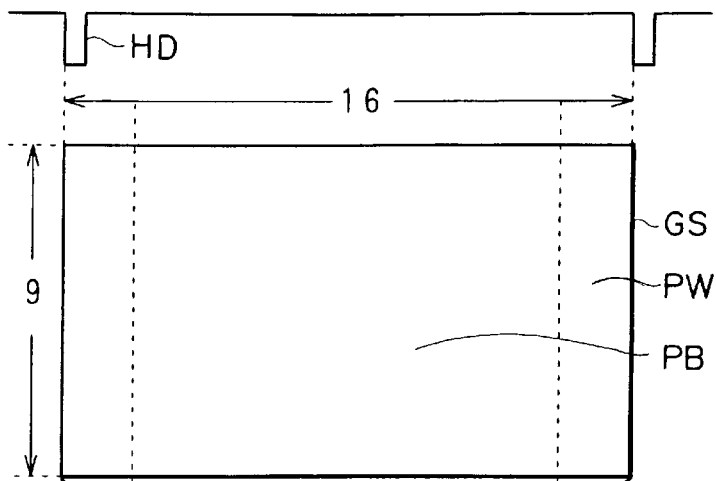
FIGS. 20A to 20C are diagrammatic views illustrating the pan scan process illustrated in FIGS. 19A to 19D.
Figure 20B:
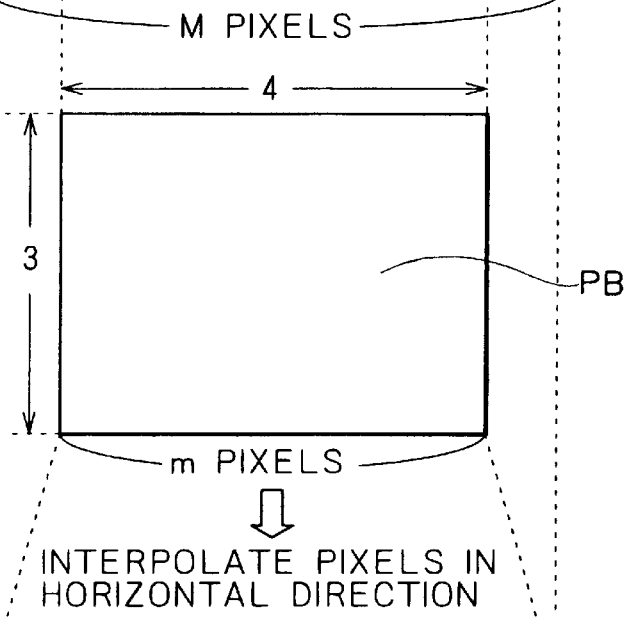
Figure 20C:
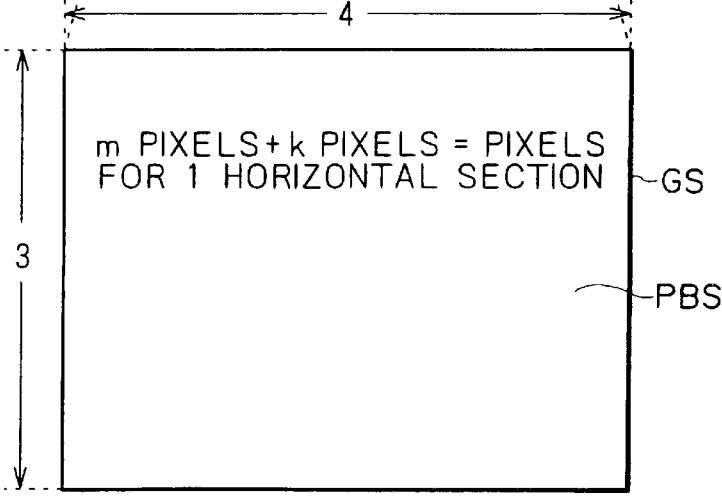

Thus, the WM decoding section 57 for extracting and discriminating electronic watermark information from a video signal for forming an image of the aspect ratio of 16:9 can be constructed in such a manner as shown in FIG. 14. Referring to FIG. 14, video data from the video data decoding section 53 are supplied to a despreading section 575 and a synchronism detection section 571. The synchronism detection section 571 detects a vertical synchronizing timing signal V and a horizontal synchronizing timing signal H and supplies its detection outputs to a PN code generation control section 572.

The PN code generation control section 572 is formed in a similar manner to the PN code generation control section 32 shown in FIG. 2 of the authoring apparatus described hereinabove with reference to FIG. 1, and generates a PN generation enable signal EN representative of a section within which PN codes are to be generated, a reset signal RE indicative of a generation starting timing for PN codes and a clock signal PNCLK based on the vertical synchronizing timing signal V and the horizontal synchronizing timing signal H supplied thereto from the synchronism detection section 571.

The signals generated by the PN code generation control section 572 are supplied to a PN code generation section 573. Further, the PN generation enable signal EN and the clock signal PNCLK are supplied also to a PN code repetition section 574. The PN code repetition section 574 is constructed in a similar manner to the PN code repetition section 34 of the authoring apparatus described hereinabove with reference to FIG. 3.

Thus, the PN code generation section 573 generates a PN code train same as that when duplication control information is spectrum spread and superposed on a video signal at same timings for the video data with electronic watermark information superposed thereon for forming an image of the aspect ratio of 16:9, and the PN code train is repeated by the PN code repetition section 574. Consequently, a PN code train PSr is formed for each unit block of 8×8 pixels at the same timing as the duplication control information is spectrum spread.

The PN code train PSr from the PN code repetition section 574 is supplied to the despreading section 575, by which despreading is performed for the PN code train PSr to detect the duplication control information superposed on the video signal. The duplication control information is supplied to a WM determination section 576, by which a duplication control state indicated by the detected duplication control information is determined. Then, the determination output is supplied to the control section 60.

In this instance, the video signal for forming an image of the aspect ratio of 16:9 has superposed thereon electronic watermark information which can be extracted from a video signal formed by the normal process and from a video signal for forming an image of the aspect ratio of 16:9, electronic watermark information which can be extracted from a video signal formed by the letter box process and electronic watermark information which can be extracted from a video signal formed by the pan scan process, such that they are different from each other for each one frame.

Thus, where PN codes of 1 chip are allocated to a unit block of a size of 8×8 pixels in a vertical period to effect despreading as described above, by performing despreading of a video signal for at most 3 frames, electronic watermark information superposed on a video signal read out from the DVD 100 for forming an image of the aspect ratio of 16:9 can be extracted from the video signal.

Further, the output data of the descrambling section 52 are supplied to an encipherment section 58, by which encipherment based on a cryptographic key, which is different among different communications, is performed for the compressed video data under the control of the control section 60. The enciphered data from the encipherment section 58 are outputted to an electronic apparatus of an outputting destination through an IEEE 1394 interface 59 and an output terminal 59d. The IEEE 1394 interface 59 performs data conversion for the enciphered data so that data which comply with the IEEE 1394 interface standards may be obtained, and outputs the obtained data.

In this instance, the control section 60 communicates with the apparatus of the outputting destination through the IEEE 1394 interface 59 to determine whether or not the apparatus of the outputting destination is a compliant apparatus and, if the apparatus of the outputting destination is a compliant apparatus, whether or not the apparatus is a recording apparatus.

Then, the control section 60 decides, from a determination outputs of duplication control information from the CGMS decoding section 56 and the WM decoding section 57 and determination information of the apparatus of the outputting destination received through the IEEE 1394 interface 59, whether or not cryptographic key information to be used for decipherment by the encipherment section 58 should be outputted to the outputting destination.

For example, if the outputting destination is a non-compliant apparatus, then the cryptographic key is not transmitted to the apparatus of the outputting destination. Further, even if the outputting destination is a compliant apparatus, then if it is a recording apparatus, then when the CGMS information is "11" indicative of "inhibition of duplication" or when the electronic watermark information indicates "inhibition of duplication", the cryptographic key information is not transmitted to the apparatus of the outputting apparatus.

In this manner, the reproduction apparatus reads out a video signal, on which electronic watermark information as duplication control information is superposed and CGMS information as different duplication control information is superposed, from the DVD 100, performs necessary processing such as descrambling processing (decipherment processing), decompression processing of the compressed digital video signal and formation processing of an output video signal to form an analog video signal to be outputted to a monitor receiver or the like and a digital video signal to be outputted through a digital interface.

Then, the digital video signal outputted through the digital interface is prevented from being illegally duplicated by the function of the digital interface IEEE 1394 as described above and can be transferred to the recording apparatus side together with the electronic watermark information and the CGMS information superposed thereon without any miss. Consequently, illegal duplication can be prevented with certainty.

Meanwhile, the analog video signal outputted has, although it has been obtained by conversion so as to form an image of the aspect ratio of 4:3, electronic watermark information superposed thereon which corresponds to the normal process, letter box process and pan scan process. Therefore, the recording apparatus which receives the analog video signal is constructed so as to extract the electronic watermark information superposed on the analog video signal and effect duplication control appropriately based on the electronic watermark information as described below.

[Compliant Recording Apparatus]

FIG. 15 is a block diagram showing an example of a construction of a compliant recording apparatus which receives a video signal reproduced by the reproduction apparatus shown in FIG. 13 and records the received video signal onto a DVD 200 which is a RAM disk.

Referring to FIG. 15, the compliant recording apparatus has a digital input terminal 71d for the IEEE 1394 interface and an analog input terminal 74a. The digital input terminal 71d is connected to an IEEE 1394 interface 71.

The IEEE 1394 interface 71 performs processing of converting data, which have been converted so as to comply with the IEEE 1394 bus interface standards, back into original data. A control section 80 can communicate with an apparatus of a supply source of a digital video signal through the IEEE 1394 interface 71 to determine the type of the apparatus of the supply source.

Data from the IEEE 1394 interface 71 are supplied to a decipherment section 72. As described hereinabove, for information with regard to which it has been determined by an apparatus connected to the digital input terminal 71d that duplication of the information signal is permitted, cryptographic key information for deciphering the information is transmitted from the apparatus to the compliant recording apparatus. If the cryptographic key information is acquired, then the decipherment section 72 deciphers the data from the IEEE 1394 interface 71 to restore the original compressed video data. The restored compressed video data are supplied to a selector 73.

Meanwhile, video information inputted through the analog input terminal 74a is supplied through an analog interface 74 to a compression encoding section 75, by which it is MPEG compressed. Then, resulting data are supplied from the compression encoding section 75 to the selector 73.

The selector 73 selectively outputs the data from the decipherment section 72 or the data from the compression encoding section 75 in accordance with a selector control signal corresponding to a selective input from the user inputted through a key operation section 81. The output data of the selector 73 are supplied to a recording control section 78. The output data of the selector 73 are supplied also to a CGMS decoding section 76 and a WM decoding section 77.

The CGMS decoding section 76 is constructed in a similar manner to the CGMS decoding section 56 of the reproduction apparatus described hereinabove with reference to FIG. 13. Meanwhile, the WM decoding section 77 is formed substantially similar to the WM decoding section 57 of the reproduction apparatus described hereinabove with reference to FIG. 14, but additionally has an MPEG decoding function.

In particular, the WM decoding section 77 of the present recording apparatus has a function of MPEG decoding a digital video signal compressed in accordance with the MPEG system and supplied thereto, and can thus extract and determine electronic watermark information superposed on a video signal prior to the compression accurately and with certainty.

The CGMS decoding section 76 and the WM decoding section 77 effect extraction and determination of CGMS information and electronic watermark information in a similar manner to the CGMS decoding section 56 and the WM decoding section 57 of the reproduction apparatus described hereinabove with reference to FIG. 13, respectively. Then, determination outputs of the CGMS information and the electronic watermark information are supplied to the control section 80.

In this instance, the video signal outputted from the selector 73 is either a digital signal inputted through the IEEE 1394 interface 71 or an analog signal inputted through the analog interface 74. However, in both of a digital video signal outputted from the reproduction apparatus with reference to FIG. 13 and an analog video signal for forming an image of the aspect ratio of 4:3, electronic watermark information is superposed in a spectrum spread state with PN codes whose one chip is allocated for each unit block after conversion of 8×8 pixels in one vertical period.

Thus, a PN code generation control section of the WM decoding section 77 forms a reset signal RE, an enable signal EN and a clock signal PNCLK based on a vertical synchronizing timing signal V and a horizontal synchronizing timing signal H extracted from the video signal supplied to the WM decoding section 77 as shown in FIGS. 5A to 5F. Then, the PN code generation control section generates PN codes for despreading using the thus formed timing signals so that one chip of the PN codes may be allocated for each one unit block of 8×8 pixels.

Consequently, whether the video signal is a video signal for forming an image of the aspect ratio of 16:9 or another video signal obtained by conversion for forming another image of the aspect ratio of 4:3, electronic watermark information superposed on the video signal can be extracted.

It is to be noted that, where the video signal is a video signal formed by the letter box process for forming an image of the aspect ratio of 4:3, the display position of the image PSW of the aspect ratio of 16:9 is displaced with respect to the vertical synchronizing signal. In this instance, the display position of the image PSW is determined in advance.

Thus, where the video signal is a video signal formed by the letter box process, the generation starting position of PN codes is displaced from the position S to the position P as shown in FIG. 6B. Therefore, the PN code generation control section of the WM decoding section 77 should form an enable signal EN indicative of a section in which PN codes should be generated and generate PN codes for despreading in a video signal portion in which the image PSW is to be formed.

In this instance, the size of a unit block to which one chip of PN codes for despreading is allocated is 8×8 pixels and fixed. Therefore, the generation starting position of PN codes is displaced with the enable signal EN so that PN codes for despreading may be generated so as to allocate one chip of the PN codes for each unit block of 8×8 pixels of the portion of the video signal in which the image PSW is to be formed. This allows extraction of electronic watermark information from a video signal formed by the letter box process.

It is to be noted that, for example, where the video signal supplied is an analog video signal for forming an image of the aspect ratio of 4:3, the recording apparatus shown in FIG. 15 cannot determine which one of the normal process, letter box process and pan scan process was used to form the video signal.

Therefore, the recording apparatus as shown in FIGS. 5A to 5F first performs extraction of electronic watermark information using the timing signals including the reset signal RE, enable signal EN and clock signal PNCLK assuming that electronic watermark information is superposed on the video signal beginning with the top line of each block. If extraction of electronic watermark information by the extraction processing is not performed successfully, then extraction processing of electronic watermark information corresponding to the letter box process in which the generation section of PN codes is displaced as shown in FIGS. 16A to 16D is performed.

Consequently, electronic watermark information superposed on a video signal can be extracted by whichever one of the normal process, letter box process and pan scan process on the video signal formation.

In this manner, where the authoring apparatus time-divisionally superposes electronic watermark information corresponding to the normal process, letter box process and pan scan process on a video signal for forming an image of the aspect ratio of 16:9, even if the video signal to be reproduced, for example, by the reproduction apparatus shown in FIG. 13 is a video signal for forming an image of the aspect ratio of 4:3 obtained by conversion using one of the normal process, letter box process or pan scan process, the electronic watermark signal can be extracted from the video signal after conversion without changing the extraction method.

The control section 80 controls the recording control section 78 based on CGMS information from the CGMS decoding section 76 and a result of the determination of electronic watermark information from the WM decoding section 77, and supplies only a video signal whose recording (duplication) is permitted, to a scrambling section 79. The scrambling section 79 performs scrambling processing (encipherment processing) for the video signal supplied thereto and records the thus scrambled video signal onto the DVD (RAM disk) 200.

It is to be noted that, when the selector 73 in the recording apparatus shown in FIG. 15 is switched so as to output data from the encoding section 75, the video signal outputted from the selector 73 is the video signal supplied through the analog interface 74 for forming an image of the aspect ratio of 4:3, having been formed from a video signal for forming another image of the aspect ratio of 16:9.

In this instance, when an analog video signal for forming an image of the aspect ratio of 4:3 is formed from a digital video signal for forming another image of the aspect ratio of 16:9, CGMS information added to the digital video signal may sometimes be missed.

Therefore, when the selector 73 is switched so as to output data from the encoding section 75, the CGMS decoding section 76 does not perform decoding processing of CGMS information, but recording control is performed based only on electronic watermark information extracted by the WM decoding section 77.

It is to be noted that, in the embodiment described above, electronic watermark information corresponding to the pan scan process is superposed on a video signal in a portion of an image PW of the aspect ratio of 16:9 which forms an image PB to be cut out as illustrated in FIG. 8A. Consequently, if the image PW of the aspect ratio of 16:9 is displayed as it is, a difference in appearance appears between the image PB portion on which the electronic watermark information is superposed and the remaining image portion on which the electronic watermark information is not superposed.

Thus, dummy information is superposed with a very low level similar to that of electronic watermark information on the image portion other than the image PB to be cut out. In this instance, since the image portion other than the image PB is abandoned if the pan scan process is performed for the video signal, information having some significance need not be superposed on the portion.

Therefore, on the image portion other than the image PB to be cut out in the top horizontal section of a unit block before conversion, for example, a different PK code train is superposed. For example, a PN generation section for generating a different PN code train is provided in the WM formation section 3 and superposes a PN code train from the PN generation section for generating a different PN code train on the image portion other than the image PB to be cut out in the top horizontal section of a unit block BL before conversion.

Where the construction just described is employed, the image PW of the aspect ratio of 16:9 does not include any image portion on which electronic watermark information is not superposed, and consequently, such a difference in appearance as described above does not appear on the displayed image.

Further, PN codes to be superposed on the image portion other than the image PB to be cut out are not limited to PN codes of a different train, but may be various other P codes. For example, some of PN codes generated by the PN generation section 33 may be used, or PN codes to be superposed on the image portion other than the image PB may be prepared in a memory of the control section 10 in advance for use when required.

Further, superposition processing for electronic watermark information corresponding to the normal process, letter box process and pan scan process is performed time-divisionally by interrupt processing for each one frame. Therefore, it is not necessary to provide WM formation sections corresponding to the processes, respectively.

Naturally, it is otherwise possible to provide WM formation sections corresponding to the different processes and perform superposition of electronic watermark information corresponding to the different processes time-divisionally. Further, where WM formation sections corresponding to the different processes are provided, superposition of electronic watermark information corresponding to the individual processes may be performed simultaneously.

In particular, electronic watermark information corresponding to the different processes can be superposed on the same frame. In this instance, trains of PN codes different from each process are used for spectrum spreading. Where trains of PN codes different from each process are used in this manner, electronic watermark information corresponding to each process can be extracted accurately.

On the other hand, upon superposition of electronic watermark information corresponding to the respective normal mode, letter box mode and pan scan mode, a PN code train need not be generated every time as required as described above, but it may be prepared in a ROM of the control section 10 in advance and used upon spectrum spreading.

In this instance, the PN code train prepared in advance in the ROM of the control section 10 may be preset to the shift register of the PN repetition section 34 of the WM formation section 3 and repetitively read out to generate a PN code train corresponding to each unit block.

Further, in the embodiment described above, a PN code train PS for one horizontal section generated in the top horizontal section of a unit block before conversion is repeated by a number of times equal to the number of horizontal sections of the unit block before conversion in the vertical direction to allocate PN codes of one chip to each unit block before conversion. However, the allocation of PN codes is not limited to this.

For example, where the video signal is a digital signal, PN codes to be allocated to each unit block before conversion are prepared, for example, in a memory in advance. Then, using suitable software, PN codes of one chip are allocated for each unit block before conversion of the digital video signal.

In this instance, different kinds of electronic watermark information corresponding to each one of the normal process, letter box process and pan scan process are prepared in advance, and PN codes of one chip are allocated for each unit block before conversion whose size is determined in accordance with the size of a unit block after conversion and a method used to convert a video signal for forming an image of the aspect ratio of 16:9 into another video signal for forming another image of the aspect ratio of 4:3.

In particular, as described hereinabove, when electronic watermark information corresponding to the normal process is superposed on a video signal before conversion, the size of a unit block before conversion is 8×8 pixels, but when electronic watermark information corresponding to the letter box process is superposed on a video signal before conversion, the size of a unit block before conversion is 10×8 pixels and 11×8 pixels present in a mixed state. On the other hand, when electronic watermark information corresponding to the pan scan process is superposed on a video signal before conversion, the size of a unit block before conversion is 8×6 pixels. In this manner, PN codes of one chip should be allocated to a unit block before conversion whose size is determined in advance for each of the different processes.

Where the video signal on which electronic watermark signal is to be superposed is a digital signal, the electronic watermark information may be superposed on the digital signal before MPEG encoding or may be superposed on the digital video signal after MPEG encoding. However, since, upon superposition of electronic watermark information, PN codes of one chip are allocated for each unit block, also upon despreading, the electronic watermark information can be extracted if PN codes the same as those upon spectrum spreading are generated at the same timings for each unit block.

Further, in the embodiment described above, electronic watermark information is superposed for each unit block for one frame, the superposition is not limited to this. The present invention can also be applied to a case wherein electronic watermark information is superposed for each unit block composed of a plurality of frames. The present invention can also be applied to another case wherein electronic watermark information is superposed for each unit block composed of a ½ frame or for each unit block composed of ⅓ frame.

Where electronic watermark information is superposed in such a manner as described above, superposition processing of electronic watermark information corresponding to the different processes of the normal process, letter box process and pan scan process performed time-divisionally should be performed in accordance with a reset period of PN codes with which electronic watermark information is spectrum spread. In particular, superposition processing of electronic watermark information corresponding to each of the processes described above should be performed by interrupt processing for each reset period of PN code such as for each plurality of frames, for each ½ frame or for each ⅓ frame.

In this instance, information for synchronization of the reset period of PN codes should be added during a vertical blanking period where the video signal is an analog signal, but should be added, for example, for each GOP (Group Of Pictures) of an MPEG encoded video signal where the video signal is a digital signal. In this manner, various methods can be used.

Also the size of a unit block upon despreading is not limited to 8×8 pixels. The unit block including a plurality of pixels in the horizontal direction and the vertical direction may be any size, and the size of a unit block before conversion may be determined in accordance with the size of a unit block after conversion.

Further, in the embodiment described above, electronic watermark information which can be extracted from a video signal outputted without being converted for forming an image of the aspect ratio of 16:9 and a video signal formed by the normal process, electronic watermark information which can be extracted from a video signal formed by the letter box process and electronic watermark information which can be extracted from a video signal formed by the pan scan process are superposed time-divisionally.

However, the electronic watermark information to be superposed is not limited to those described above. For example, electronic watermark information corresponding to the normal process and electronic watermark information corresponding to the letter box process may be superposed, or electronic watermark information corresponding to the normal process and electronic watermark information corresponding to the pan scan process may be superposed, or otherwise, electronic watermark information corresponding to the letter box process and electronic watermark information corresponding to the pan scan process may be superposed.

In other words, two different ones of the three kinds of electronic watermark information including electronic watermark information corresponding to the normal process, electronic watermark information corresponding to the letter box information and electronic watermark information corresponding to the pan scan process may be superposed in combination.

Naturally, it is otherwise possible to superpose only electronic watermark information corresponding to the normal process, to superpose only electronic watermark information corresponding to the letter box process or to superpose only electronic watermark information corresponding to the pan scan process.

Further, the present invention can be applied not only to the letter box mode or pan scan mode described above, but also, for example, to a case wherein the region in which an image is to be displayed is determined in advance as in the letter box mode and a video signal of the aspect ratio of 4:3 is formed or another case wherein an image to be cut out is determined in advance as in the pan scan mode and a video signal of the aspect ratio of 4:3 is formed.

In this instance, the size of a unit block before conversion should be set based on the position or the magnitude of the region in which an image is to be displayed or the position and the magnitude of an image to be cut out and a manner of conversion when a video signal for forming an image of the aspect of 16:9 is converted into another video signal for forming another image of the aspect ratio of 4:3, and PN codes of one chip should be allocated for each unit block before conversion whose size has been set in this manner.

Further, in the embodiment described above, the recording medium onto which a video signal is recorded by the authoring apparatus is a DVD. However, the recording medium is not limited to this, and the present invention can be applied also to another authoring apparatus in which a video tape, a magnetic disk, an optical disk or a magneto-optical disk is used as the recording medium.

Furthermore, in the embodiment described above, the present invention is applied to an authoring apparatus. However, the present invention is not limited to this. For example, an additional information superposition method and a video signal outputting apparatus according to the present invention can be applied to a various of recording apparatus and/or reproduction apparatus, such as a VTR or a DVTR or a recording apparatus for a DVD used in a home, and a receiver for a digital broadcast called set top box.

For example, where the present invention is applied to a recording apparatus such as a VTR, the WM formation section 3 described hereinabove with reference to FIG. 1 is incorporated in the recording apparatus such that electronic watermark information corresponding to each one of the normal process, letter box process and pan scan process described above is superposed on and recorded together with a video signal to be recorded onto a recording medium.

On the other hand, where the present invention is applied to a reproduction apparatus or a set top box, if the WM formation section 3 described hereinabove with reference to FIG. 1 is incorporated in such the apparatus, for example, when a video signal for forming an image of the aspect ratio of 16:9 is converted into and outputted as another video signal for forming another image of the aspect ratio of 4:3, electronic watermark information formed in accordance with the video signal to be formed can be superposed on and outputted together with the video signal.

The electronic watermark information is not limited to duplication control information, but may be, for example, copyright information, or for a recording apparatus, a reproduction apparatus or a set top box for use in a home, a manufacture number or an identification ID of the apparatus. Where the electronic watermark information to be superposed on a video signal is copyright information or the like, it can be utilized for pursuit or prosecution of a pirate and an illegal manufacturer by detecting it.

Further, the spread codes to be used for spectrum spreading on additional information are not limited to PN codes, but various spread codes can be utilized.

While a preferred embodiment of the present invention has been described using specific terms, such description is for illustrative purposes only, and it is to be understood that changes and variations may be made without departing from the spirit or scope of the following claims.

What is claimed is:

1. An additional information superposition method for superposing additional information spectrum spread with spread codes synchronized with a vertical synchronizing signal on a second video signal for forming an image of an aspect ratio of N:n which is to be converted into and outputted as a first video signal for forming an image of another aspect ratio of M:m, comprising the steps of:

setting a size of a unit block before conversion in the second video signal based on a size of a unit block after conversion to which one chip of spread codes for despreading determined in advance is allocated and co contents of a conversion process into the first video signal; and superposing the additional information spectrum spread with the spread codes of one chip allocated for each unit block before conversion having the set size in such a manner as to allow the additional information to be extracted from the first video signal.

2. An additional information superposition method according to claim 1, wherein the first video signal is formed from the second video signal for forming an image of the aspect ratio of N:n by thinning out or interpolating pixels of the image of the second video signal in a horizontal direction or a vertical direction, and the size of the unit block before conversion is set in response to the number of pixels to be thinned out from or interpolated to the unit block before conversion in the horizontal direction or the vertical direction.

3. An additional information superposition method according to claim 2, wherein the first video signal is for displaying the entire image of the aspect ratio of N:n to be formed with the second video signal without changing the aspect ratio thereof in a predetermined region including a plurality of horizontal lines in a predetermined range of the screen of the aspect ratio of M:m in the vertical direction, and the size of the unit block before conversion is set in response to the number of horizontal lines to be thinned out in the vertical direction from the unit block before conversion.

4. An additional information superposition method according to claim 1, wherein the first video signal is for displaying an image cut out from an image of the aspect ratio of N:n formed from the second video signal into a predetermined required range in the horizontal direction thereof, and the spread codes of one chip are allocated to each unit block before conversion in the image portion of the predetermined range of the second video signal.

5. An additional information superposition method according to claim 4, wherein the first video signal is formed from the second video signal by thinning out or interpolating pixels in the horizontal direction or the vertical direction of the image of the predetermined range in the horizontal direction, and the size of the unit block before conversion is set based on the number of pixels to be thinned out from or interpolated to the unit block before conversion in the horizontal direction or the vertical direction.

6. An additional information superposition method according to claim 4, wherein dummy information is superposed on the video signal in an image portion of the second video signal outside the predetermined range in the horizontal direction.

7. An additional information superposition method according to claim 5, wherein dummy information is superposed on the video signal in an image portion of the second video signal outside the predetermined range in the horizontal direction.

8. An additional information superposition method according to claim 1, wherein the first video signal formed from the second video signal is either of a type for causing an entire image of the second video signal for forming an image of the aspect ratio of N:n to be displayed on an overall screen of the aspect ratio of M:m, or of another type for causing an entire image of the aspect ratio of N:n, which is to be formed with the second video signal, to be displayed without changing the aspect ratio thereof in a predetermined area of a screen of the aspect ratio of M:m including a plurality of horizontal lines in a predetermined range in the vertical direction, providing the unit block before conversion and the unit block after conversion having a predetermined equal size, processing of superposing the additional information spectrum spread with the spread codes with the spread codes of one chip allocated for each block unit before conversion on the second video signal and processing of setting the size of the unit block before conversion in accordance with the number of horizontal lines to be thinned out in the vertical direction from the unit block before conversion and superposing the additional information spectrum spread with the spread codes of one chip allocated for each unit block before conversion having the set size on the second video signal are performed time-divisionally.

9. An additional information superposition method according to claim 1, wherein the first video signal formed from the second video signal is either of a type for causing an entire image of the second video signal for forming an image of the aspect ratio of N:n to be displayed on an overall screen of the aspect ratio of M:m, or of another type for causing an image cut out from an image of the aspect ratio of N:n, which is to be formed with the second video signal, into a predetermined ri required range in the horizontal direction thereof to be displayed, providing the unit block before conversion and the unit block after conversion having a predetermined equal size, processing of superposing the additional information spectrum spread with the spread codes of one chip allocated for each block unit before conversion on the second video signal and processing of superposing the additional information spectrum spread with the spread codes of one chip allocated for each unit block before conversion in the image portion of the predetermined range in the second video signal on the second video signal are performed time-divisionally.

10. An additional information superposition method according to claim 1, wherein the first video signal formed from the second video signal is either of a type for causing an entire image of the aspect ratio of N:n, which is to be formed with the second video signal, to be displayed without changing the aspect ratio thereof in a predetermined area of a screen of the aspect ratio of M:m including a plurality of horizontal lines in a predetermined range in the vertical direction, or of another type for causing an image cut out from an image of the aspect ratio of N:n, which is to be formed with the second video signal, into a predetermined required range in the horizontal direction thereof to be displayed, processing of setting the size of the unit block before conversion based on the number of horizontal lines to be thinned out in the vertical direction, processing of superposing the additional information spectrum spread with the spread codes of one chip allocated for each block unit before conversion having the set size on the second video signal and processing of superposing the additional information spectrum spread with the spread codes of one chip allocated for each unit block before conversion of the image portion of the predetermined range of the second video signal on the second video signal are performed time-divisionally.

11. An additional information superposition method according to claim 8, wherein the first video signal for causing an image cut out from an image of the aspect ratio of N:n, which is to be formed by the second video signal, into a predetermined required range in the horizontal direction thereof to be displayed is formed by thinning out or interpolating pixels of the image of the predetermined range in the horizontal direction or the vertical direction, and the size of the unit block before conversion in the image portion of the predetermined range is set based on the number of pixels to be thinned out from or interpolated to the unit block before conversion in the horizontal direction or the vertical direction.

12. An additional information superposition method according to claim 9, wherein the first video signal for causing an image cut out from an image of the aspect ratio of N:n, which is to be formed by the second video signal, into a predetermined required range in the horizontal direction thereof to be displayed is formed by thinning out or interpolating pixels of the image of the predetermined range in the horizontal direction or the vertical direction, and the size of the unit block before conversion in the image portion of the predetermined range is set based on the number of pixels to be thinned out from or interpolated to the unit block before conversion in the horizontal direction or the vertical direction.

13. An additional information superposition method according to claim 1, wherein the first video signal is for forming an image of an aspect ratio of 4:3, and the second video signal is for forming an image of another aspect ratio of 16:9.

14. A video signal outputting apparatus for superposing additional information spectrum spread with spread codes synchronized with a vertical synchronizing signal on a second video signal for forming an image of an aspect ratio of N:n which is to be converted into and outputted as a first video signal for forming an image of another aspect ratio of M:m, comprising:

a synchronizing signal detection section for detecting a video synchronizing signal from the second video signal;

a spread code generation control section for forming a generation timing signal synchronized with the video synchronizing signal from said synchronizing signal detection section for controlling a generation timing of the spread codes based on a size of a unit block before conversion in the second video signal which is set based on a size of a unit block after conversion to which one chip of spread codes for despreading determined in advance are allocated and contents of conversion processing into the first video signal in such a manner as to allow the additional information to be extracted from the first video signal;

a spread code generation section for generating the spread codes in response to the generation timing signal from said spread code generation control section;

a spreading section for receiving the additional information before spectrum spreading to be superposed on the second video signal and the spread codes from said spread code generation section and spectrum spreading the additional information with the spectrum codes; and an additional information superposition section for superposing the additional information spectrum spread by said spreading section on the second video signal.

15. A video signal outputting apparatus according to claim 14, wherein the first video signal is formed from the second video signal for forming an image of the aspect ratio of N:n by thinning out or interpolating pixels of the image of the second video signal in a horizontal direction or a vertical direction, and said spread code generation control section forms the generation timing signal based on the size of the unit block before conversion set in response to the number of pixels to be thinned out from or interpolated to the unit block before conversion in the horizontal direction or the vertical direction.

16. A video signal outputting apparatus according to claim 14, wherein the first video signal is for displaying the entire image of the aspect ratio of N:n to be formed with the second video signal without changing the aspect ratio thereof in a predetermined region including a plurality of horizontal lines in a predetermined range of the screen of the aspect ratio of M:m in the vertical direction, and said spread code generation control section forms the generation timing signal based on the size of the unit block before conversion set in response to the number of horizontal lines to be thinned out in the vertical direction from the unit block before conversion.

17. A video signal outputting apparatus according to claim 14, wherein the first video signal is for displaying an image cut out from an image of the aspect ratio of N:n formed from the second video signal into a predetermined required range in the horizontal direction thereof and said spread code generation control section forms the generation timing signal for controlling the generation starting timing of the spread codes such that the spread codes of one chip are allocated to each unit block before conversion of the predetermined range beginning with a top unit block before conversion in the predetermined range to be cut out from the second video signal.

18. A video signal outputting apparatus according to claim 17, wherein the first video signal is formed from the second video signal by thinning out or interpolating pixels of the image of the predetermined range in the horizontal direction or the vertical direction, and said spread code generation control section forms the generation timing signal for controlling the generation timing of the spread codes based on the size of the unit block before conversion set in accordance with the number of pixels to be thinned out from or interpolated to the unit block before conversion in the horizontal direction or the vertical direction.

19. A video signal outputting apparatus according to claim 17, further comprising a dummy information formation section for forming dummy information to be superposed on the video signal in an image portion of the second video signal outside the predetermined range.

20. A video signal outputting apparatus according to claim 18, further comprising a dummy information formation section for forming dummy information to be superposed on the video signal in an image portion of the second video signal outside the predetermined range.

21. A video signal outputting apparatus according to claim 14, wherein the first video signal formed from the second video signal is either of a type for causing an entire image of the aspect ratio of N:n, which is to be formed with the second video signal, to be displayed on an overall screen of the aspect ratio of M:m, or of another type for causing an entire image of the aspect ratio of N:n, which is to be formed with the second video signal, to be displayed without changing the aspect ratio in a predetermined area of a screen of the aspect ratio of M:m including a plurality of horizontal lines in a predetermined range in the vertical direction, providing the unit block before conversion and the unit block after conversion having a predetermined equal size, said spread code generation control section time-divisionally performs processing of forming the generation timing signal for controlling the generation timing of the spread codes based on the size of the unit block before conversion so as to generate the spread codes and superpose the additional information spectrum spread with the spread codes on the second video signal and processing of forming the generation timing signal based on the size of the unit block before conversion set in accordance with the number of horizontal line s to be thinned out in the vertical direction from the unit block before conversion so as to generate the spread codes and superpose the additional information spectrum spread with the spread codes on the second video signal.

22. A video signal outputting apparatus according to claim 14, wherein t he first video signal formed from the second video signal is either of a type for causing an entire image of the aspect ratio of N:n, which is to be formed with the second video signal, to be displayed on an overall screen of the aspect ratio of M:m, or of another type for causing an image cut out from an image of the aspect ratio of N:n, which is to be formed with the second video signal into a predetermined required range in the horizontal direction thereof to be displayed, said spread code generation control section time-divisionally performs providing unit block before conversion and the unit block after conversion having a predetermined equal size, processing of forming the generation timing signal for controlling the generation timing of the spread codes based on the size of the unit block before conversion so as to generate the spread codes and superpose the additional information spectrum spread with the spread codes on the second video signal and processing of forming the generation timing signal for controlling the generation starting timing of the spread codes so that the spread codes of one chip may be allocated for each unit block before conversion in the predetermined range beginning with a top unit block before conversion in the predetermined range to be cut out from the second video signal so as to generate the spread codes and superpose the additional information spectrum spread with the spread codes on the second video signal.

23. A video signal outputting apparatus according to claim 22, wherein the first video signal formed from the second video signal is either of a type for causing an entire image of the aspect ratio of N:n, which is to be formed with the second video signal, to be displayed without changing the aspect ratio thereof in a predetermined area of a screen of the aspect ratio of M:m including a plurality of horizontal lines in a predetermined range in the vertical direction, or of another type for causing an image cut out from an image of the aspect ratio of N:n, which is to be formed with the second video signal, into a predetermined required range in the horizontal direction thereof to be displayed, said spread code generation control section time-divisionally performs processing of forming the generation timing signal based on the size of the unit block before conversion set in accordance with the number of horizontal lines to be thinned out in the vertical direction from the unit block before conversion so as to generate the spread codes and superpose the additional information spectrum spread with the spread codes on the second video signal and processing of forming the generation timing signal for controlling the generation starting timing of the spread codes so that the spread codes of one chip may be allocated for each unit block before conversion in the predetermined range beginning with a top unit block before conversion in the predetermined range to be cut out from the second video signal so as to generate the spread codes and superpose the additional information spectrum spread with the spread codes on the second video signal.

24. A video signal outputting apparatus according to claim 22, wherein the first video signal for causing an image cut out from an image of the aspect ratio of N:n, which is to be formed by the second video signal, into a predetermined required range in the horizontal direction thereof t o be displayed is formed by thinning out or interpolating pixels of the image of the predetermined range in the horizontal direction or the vertical direction, and said spread code generation control section sets the size of the unit block before conversion in the image portion of the predetermined range based on the number of pixels to be thinned out from or interpolated to the unit block before conversion in the horizontal direction or the vertical direction.

25. A video signal outputting apparatus according to claim 23, wherein the first video signal for causing an image cut out from an image of the aspect ratio of N:n, which is to be formed by the second video signal, into a predetermined required range in the horizontal direction thereof to be displayed is formed from the second video signal for forming an image of the aspect ratio of N:n by thinning out or interpolating pixels of the image of the predetermined range in the horizontal direction or the vertical direction, and said spread code generation control section sets the size of the unit block before conversion in the image portion of the predetermined range based on the number of pixels to be thinned out from or interpolated to the unit block before conversion in the horizontal direction or the vertical direction.

26. A video signal outputting apparatus according to claim 14, wherein the first video signal is for forming an image of an aspect ratio of 4:3, and the second video signal is for forming an image of another aspect ratio of 16:9.

* * * * *